US011479291B2

(12) United States Patent
Endoh et al.

(10) Patent No.: US 11,479,291 B2
(45) Date of Patent: Oct. 25, 2022

(54) CONTROL APPARATUS

(71) Applicant: DENSO CORPORATION, Kariya (JP)

(72) Inventors: Go Endoh, Kariya (JP); Nobuyori Nakajima, Kariya (JP); Koichi Nakamura, Kariya (JP); Hiroyasu Otake, Kariya (JP)

(73) Assignee: DENSO CORPORATION, Kariya (JP)

( * ) Notice: Subject to any disclaimer, the term of this patent is extended or adjusted under 35 U.S.C. 154(b) by 304 days.

(21) Appl. No.: 16/711,857

(22) Filed: Dec. 12, 2019

(65) Prior Publication Data

US 2020/0207406 A1 Jul. 2, 2020

(30) Foreign Application Priority Data

Dec. 27, 2018 (JP) .............................. JP2018-244556
Aug. 13, 2019 (JP) .............................. JP2019-148528

(51) Int. Cl.
*B62D 5/04* (2006.01)
*H02P 27/06* (2006.01)

(52) U.S. Cl.
CPC .............. *B62D 5/046* (2013.01); *H02P 27/06* (2013.01)

(58) Field of Classification Search
CPC ................................ B62D 5/046; H02P 27/06
See application file for complete search history.

(56) References Cited

U.S. PATENT DOCUMENTS

2019/0023315 A1\* 1/2019 Takizawa ............. B62D 5/0484
2019/0144028 A1 5/2019 Taki et al.
2019/0144029 A1 5/2019 Taki et al.
2019/0144030 A1 5/2019 Sakai et al.

FOREIGN PATENT DOCUMENTS

JP 2015-81013 A 4/2015
JP 2018-139481 A 9/2018

\* cited by examiner

*Primary Examiner* — Bickey Dhakal
*Assistant Examiner* — Bradley R Brown
(74) *Attorney, Agent, or Firm* — Maschoff Brennan

(57) ABSTRACT

Each of a plurality of microcomputers outputs a motor drive signal, which is generated based on a current command value and a current limit value as a control amount command value and a control amount limit value, to each motor drive circuit. When an OFF determination of an own microcomputer is made, each microcomputer executes first end processing as a first stage of end processing and transmits an OFF determination signal to the other microcomputer. When the OFF determination signal is received from the other microcomputer, each microcomputer determines that the OFF determination has been made and starts second end processing which gradually decreases the current command value or the current control limit value from a present value. When the second end processing is completed and power-off preparation of the own microcomputer and the other microcomputer is completed, each microcomputer executes final end processing for turning off the power supply relay.

20 Claims, 23 Drawing Sheets

INDEPENDENT DRIVE

ONE SYSTEM DRIVE (HALF ASSIST)

CONTROL APPARATUS

CROSS REFERENCE TO RELATED APPLICATION

The present application claims the benefit of priority from Japanese Patent Applications No. 2018-244556 filed on Dec. 27, 2018 and No. 2019-148528 filed on Aug. 13, 2019. The entire disclosures of the above applications are incorporated herein by reference.

FIELD

The present disclosure relates to a control apparatus.

BACKGROUND

Some conventional control apparatuses are configured to function as a motor control apparatus, which controls driving of a motor by using plural microcomputers provided redundantly.

For example, in an electronic control unit of an electric power steering apparatus, a normal one of a main microcomputer and a sub-microcomputer is used to continue a required control when either one of the main microcomputer and the sub-microcomputer is abnormal.

SUMMARY

A control apparatus according to the present disclosure is provided to function as a motor control apparatus for driving a motor having a plurality of winding sets. The control apparatus comprises a plurality of motor drive circuits provided in correspondence to the plurality of winding sets, a plurality of microcomputers provided in correspondence to the plurality of motor drive circuits to form a plurality of systems, respectively, and calculating a control amount related to drive control of the motor, and at least one power supply relay capable of turning off power supplied from a power supply to each of the motor drive circuits.

DETAILED DESCRIPTION OF THE EMBODIMENT

Embodiment

A motor control apparatus according to one embodiment will be described with reference to the accompanying drawings. An ECU (electronic control unit) that functions as a motor control apparatus is applied to an EPS (electric power steering system) of a vehicle and drives a motor that outputs a steering assist torque. The ECU of this embodiment is mounted on an engine-driven vehicle, and is activated to operate when an IG (ignition) switch as a system switch and a vehicle switch, and deactivated from operation when the IG switch is turned off. An IG-OFF determination and a re-IG-ON determination, which are determinations indicating that the IG switch is turned off and turned on again, respectively, in the present embodiment correspond to an OFF determination and a re-ON determination.

Figure 1:
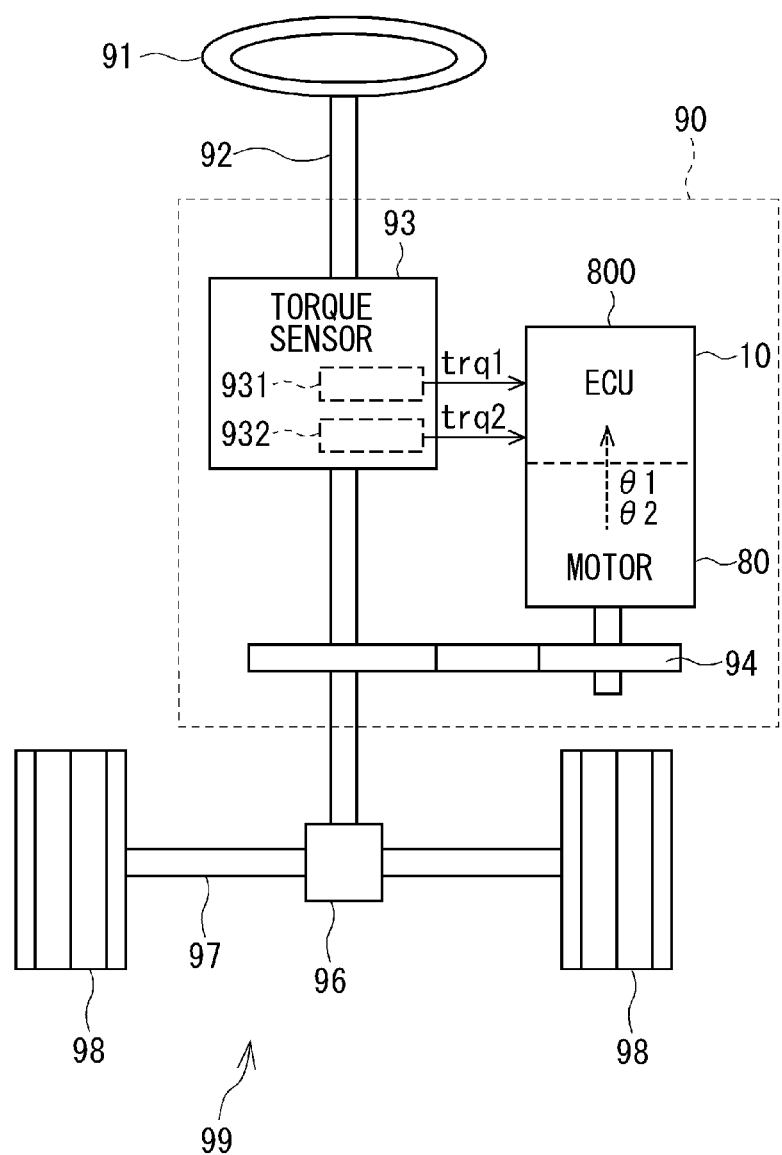
FIG. 1 is a configuration diagram of an electric power steering apparatus including an ECU which is applied as a motor driving system of a machine-electronics integrated type.
Figure 2:
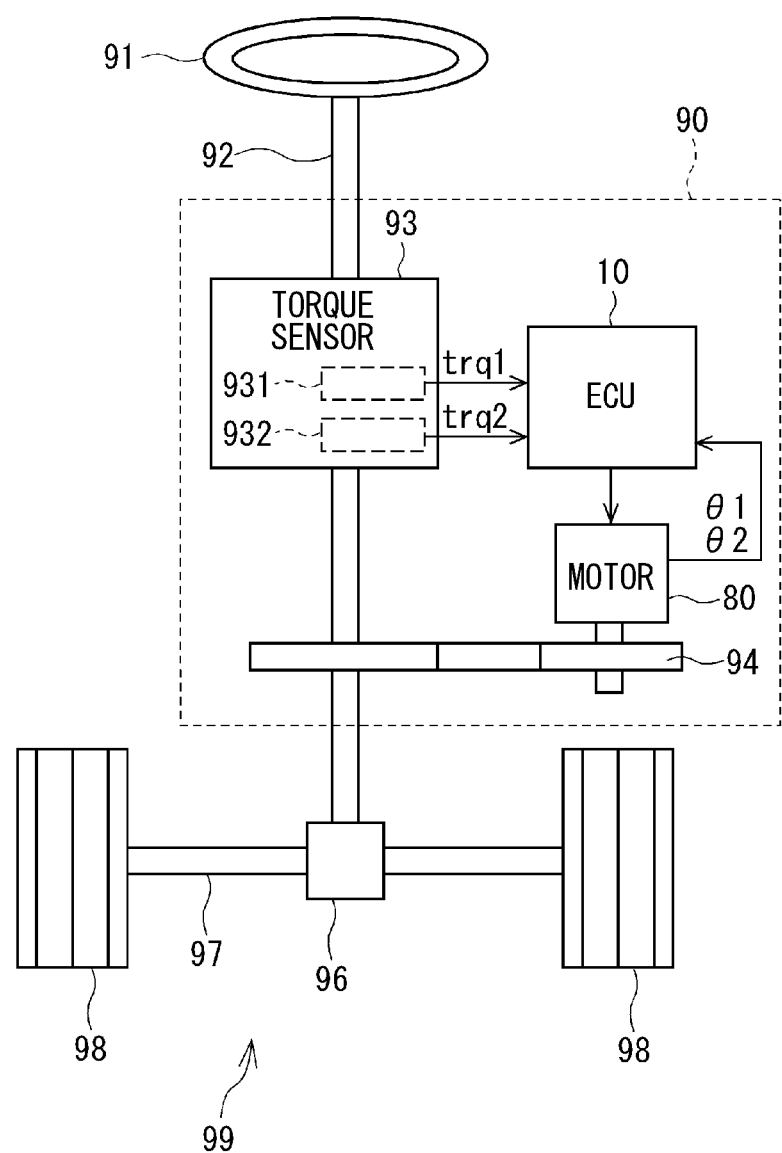
FIG. 2 is a configuration diagram of an electric power steering apparatus including an ECU which is applied as a motor driving system of a machine-electronics separated type.

First, the configuration of the EPS will be described with reference to FIG. 1 to FIG. 6 FIG. 1 and FIG. 2 show overall configurations of a steering system 99 including an EPS 90. FIG. 1 shows a machine-electronics integrated configuration in which the ECU 10 as a motor driving apparatus is integrally formed into a single body on one side of the motor 80 in the axial direction. FIG. 2 shows a machine-electronics separated configuration in which the ECU 10 and the motor 80 are physically separated and electrically connected by harnesses. Although the electric power steering apparatus 90 shown in FIG. 1 and FIG. 2 is a column assist type as described below, it may be configured to be a rack assist type.

The steering system 99 includes a steering wheel 91, a steering shaft 92, a pinion gear 96, a rack shaft 97, road wheels 98, and the like in addition to the EPS 90. The steering shaft 92 is coupled to the steering wheel 91. The pinion gear 96 provided at an axil end of the steering shaft 92 engages with the rack shaft 97. A pair of road wheels 98 are provided at both ends of the rack shaft 97 via, for example, tie rods. When a driver rotates the steering wheel 91, the steering shaft 92 coupled to the steering wheel 91 rotates. A rotational motion of the steering shaft 92 is converted into a linear motion of the rack shaft 97 by the pinion gear 96 and the pair of road wheels 98 is steered to an angle corresponding to a displacement amount of the rack shaft 97.

The EPS 90 includes, in addition to the ECU 10 and the motor 80, a steering torque sensor 93, a reduction gear 94 and the like. The steering torque sensor 93 is provided at an intermediate portion of the steering shaft 92 to detect a steering torque applied by the driver. In the embodiment shown in FIG. 1 and FIG. 2, the steering torque sensor 93 is a dual type, which includes a first torque sensor 931 and a second torque sensor 932, and detects a first steering torque trq1 and a second steering torque trq2, respectively, in a dual manner. In case that the steering torque sensors are not provided redundantly, a detected value of one steering torque trq may be used in common for the dual systems. Hereinafter, where the steering torques trq1 and trq2 are redundantly detected but not essential in the following description, the two torques trq1 and trq2 are referred to simply as one steering torque trq.

Based on the steering torques trq1 and trq2, the ECU 10 controls driving of the motor 80 so that the motor 80 generates a desired assist torque. The assist torque generated by the motor 80 is transmitted to the steering shaft 92 via the reduction gear 94. The ECU 10 acquires electrical angles 81, 82 of the motor 80 detected by a rotation angle sensor and the steering torques trq1, trq2 detected by the steering torque sensor 93. The ECU 10 controls driving of the motor 80 based on such detected information and other information such as a motor current detected inside the ECU 10.

Figure 3:
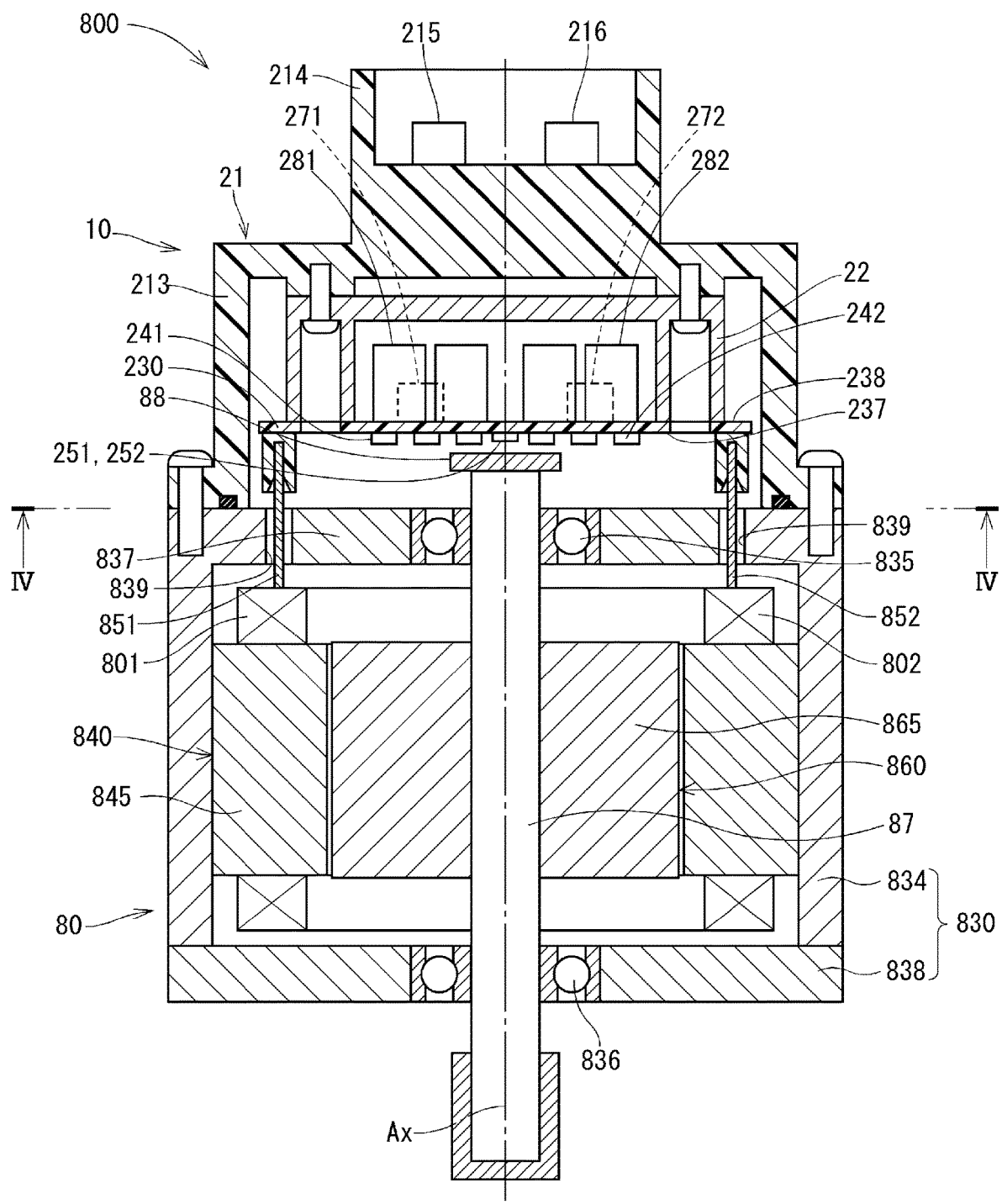
FIG. 3 is an axial cross-sectional view of a dual system of a machine-electronics integrated type.
Figure 4:
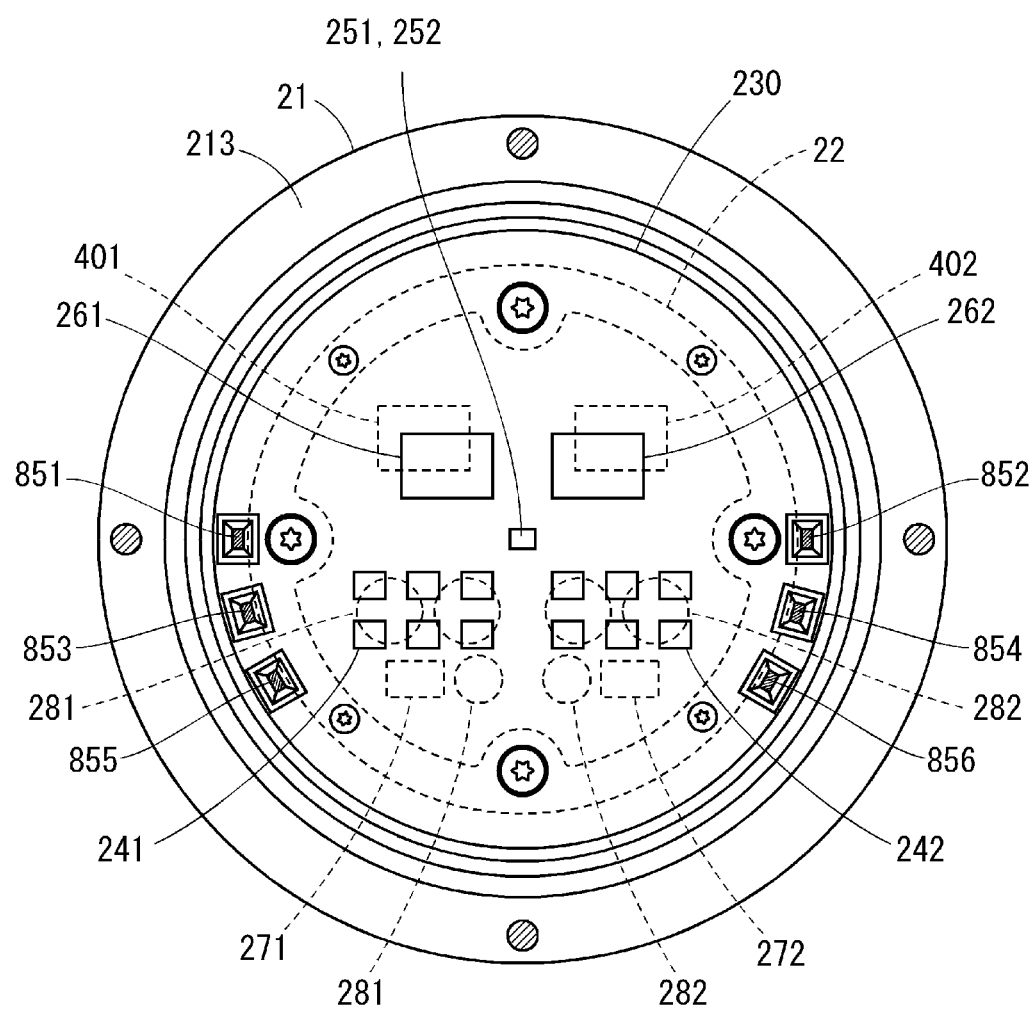
FIG. 4 is a cross-sectional view taken along a line IV-IV in FIG. 3.

A configuration of the motor 80 of the machine-electronics integrated type in which the ECU 10 is integrally formed on one side in the axial direction of the motor 80 will be described with reference to FIG. 3 and FIG. 4. The ECU 10 is positioned coaxially with an axis Ax of a shaft 87 on the side opposite to an output shaft of the motor 80. As another embodiment, the ECU 10 may be configured integrally with the motor 80 on the output side of the motor 80. The motor 80 is a three-phase brushless motor which includes a stator 840, a rotor 840 and a housing 830 which houses them.

The stator 840 has a stator core 845 fixed to the housing 830 and two groups of three-phase first and second winding sets 801, 802 assembled to the stator core 845. Lead wires 851, 853 and 855 extend from each phase winding forming the first winding set 801. Lead wires 852, 854 and 856 extend from each phase winding forming the second winding set 802. The rotor 860 has the shaft 87, which is supported by a rear bearing 835 and a front bearing 836, and a rotor core 865, into which the shaft 87 is firmly fitted. The rotor 860 is provided radially inside the stator 840 to be rotatable relative to the stator 840. A permanent magnet 88 is provided at one end of the shaft 87.

The housing 830 has a bottomed cylindrical case 834, which has a rear end frame 837, and a front end frame 838, which is provided on an open end side of the case 834. The case 834 and the front end frame 838 are fastened to each other by bolts or the like. The lead wires 851, 852 and the like of each winding set 801, 802 are passed through lead wire insertion holes 839 of the rear end frame 837 to extend to the ECU 10 side and are connected to a circuit board 230 of the ECU 10.

The ECU 10 includes a cover 21, a heat sink 22 fixed to the cover 21, the circuit board 230 fixed to the heat sink 22 and other electronic components mounted on the circuit board 230. The cover 21 is provided to protect the electronic components from external impacts and to prevent dust and water from entering into the ECU 10. The cover 21 is formed of a cover portion 213 and an external connection connector portion 214 for connection with external power supply cables and signal cables. Power supply terminals 215 and 216 of the external connection connector portion 214 are connected to the circuit board 230 via a path not shown.

The circuit board 230 is, for example, a printed circuit board and is positioned to face the rear end frame 837 and fixed to the heat sink 22. On the circuit board 230, electronic components of the first and second systems are mounted independently for each system so that the two systems are provided in a fully redundant configuration. In the present embodiment, the circuit board 230 is provided singly but, as another embodiment, two or more circuit boards may be provided. Of two main surfaces of the circuit board 230, a surface facing the rear end frame 837 is referred to as a motor surface 237 and a surface opposite to the motor surface 237, that is, a surface facing the heat sink 22 is referred to as a cover surface 238.

On the motor surface 237, a plurality of switching elements 241, 242, rotation angle sensors 251, 252, custom ICs 261, 262 and the like are mounted. In the present embodiment, there are six switching elements 241, 242 for each system and form upper (high-potential side) and lower (lower-potential side) arms of three phases of a motor drive circuit. The rotation angle sensors 251 and 252 are positioned to face the permanent magnet 88 provided at the axial end of the shaft 87. The custom ICs 261, 262 and microcomputers 401, 402 are provided as control circuits of the ECU 10.

On the cover surface 238, the microcomputers 401, 402, capacitors 281, 282, inductors 271, 272 and the like are mounted. In particular, the first microcomputer 401 and the second microcomputer 402 are positioned on the same cover surface 238 of the same circuit board 230 with a predetermined distance therebetween. The capacitors 281 and 282 smoothen an input power supplied from power supply batteries and prevent noise generated and flowing out due to the switching operation or the like of the switching elements 241 and 242, respectively. The inductors 271 and 272 form filter circuits together with the capacitors 281 and 282, respectively.

Figure 5:
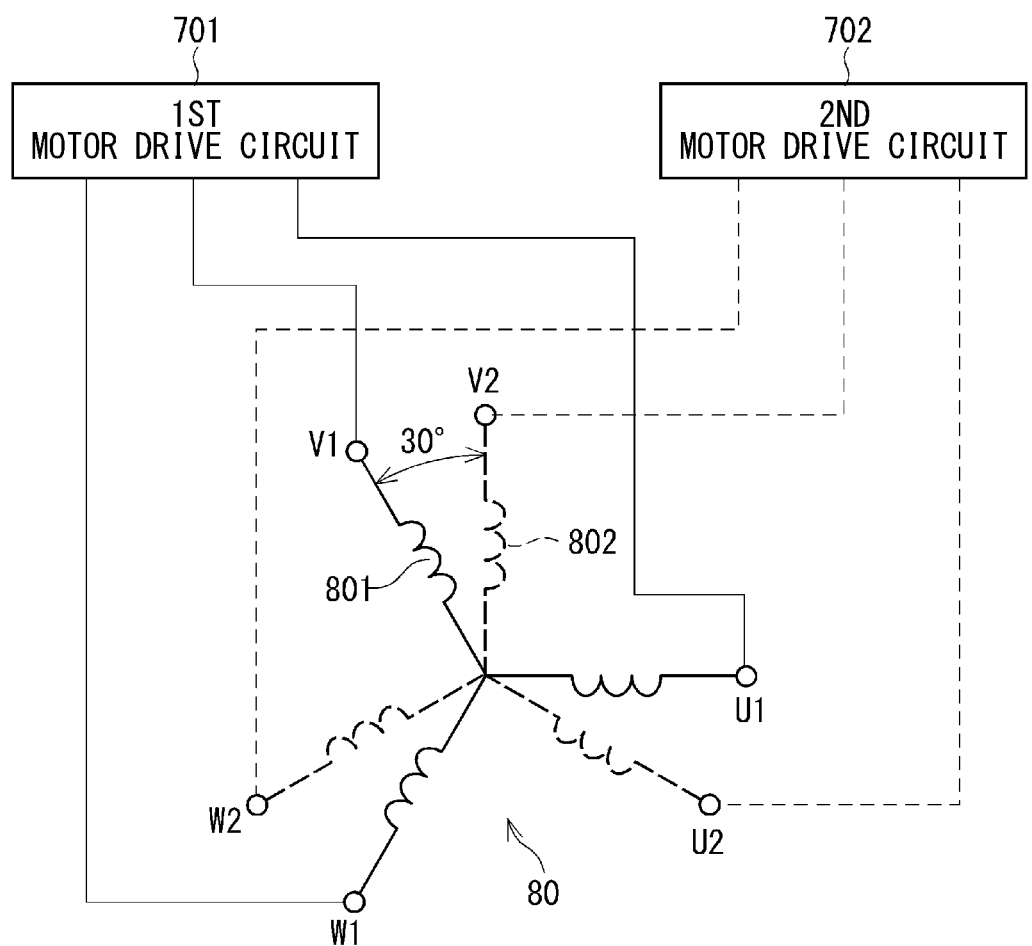
FIG. 5 is a schematic view showing a configuration of a multi-phase coaxial motor.
Figure 6:
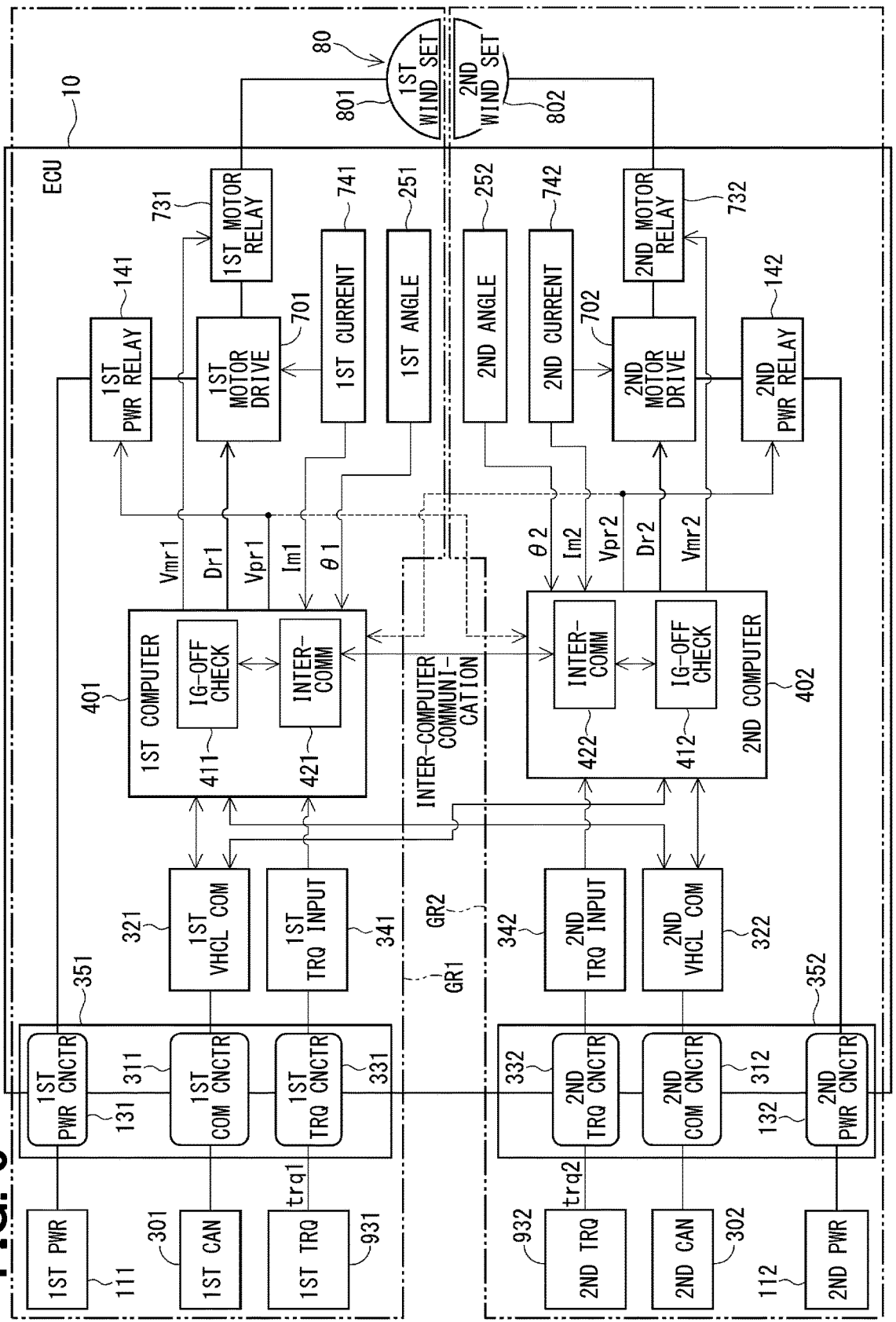
FIG. 6 is an overall configuration diagram of an ECU provided as a motor control apparatus according to each embodiment.

As shown in FIG. 5 and FIG. 6, the motor 80 to be controlled by the ECU 10 is the three-phase brushless motor which has two pairs of three-phase winding sets 801 and 802 provided coaxially. The winding sets 801 and 802 have the same electrical characteristics and are wound on the common stator while being shifted from each other by an electrical angle of 30 degrees. For this reason, the winding sets 180 and 280 are controlled so that phase currents having a same amplitude and a phase difference of 30 degrees are supplied.

[Configuration of ECU (Motor Control Device)]

Next, with reference to FIG. 6, the configuration and operational effects of the ECU 10 will be described. In the drawings including FIG. 6, the microcomputer is indicated simply as computer. The ECU 10 is mounted on a vehicle and drives the motor 80 including two winding sets 801 and 802 by two redundant systems. Hereinafter, a unit of a set of components including the microcomputers 401 and 402 and motor drive circuits 701 and 702 provided in correspondence with each other is referred to as a "system." In FIG. 6, a combination of the first winding set 801, the first microcomputer 401, the motor drive circuit 701 and the like related to current supply control for the first winding set 801 is defined as a first system GR1. The other combination of the second winding set 802 and the second microcomputer 402, the second motor drive circuit 702 and the like related to current supply control for the second winding set 802 is defined as a second system GR2. The first system GR1 and the second system GR2 are all composed of two independent element groups.

In the description, when necessary, "first" and "second" are attached to structural components and signals of the first system GR1 and the second system GR2 for distinction. However, when not necessary, "first" and "second" are not attached. Further, the structural components and signals in the first system GR1 and the second system GR2 are distinguished with "1" and "2" attached at the end of the reference numerals, respectively. Hereinafter, for a certain structural component, the system including such a component is referred to as an "own system," and another system is referred to as "the other system." Similarly, with respect to the two microcomputers 401 and 402, the microcomputer of its own system is referred to as an "own microcomputer" and another microcomputer of the other system is referred to as "the other microcomputer."

The first connector unit 351 of the ECU 10 includes a first power supply connector 131, a first vehicle communication connector 311 and a first torque connector 331. The second connector unit 352 includes a second power supply connector 132, a second vehicle communication connector 312 and a second torque connector 332. Each of the connector units 351 and 352 may be formed as a single connector unit or may be separated into a plurality of connectors.

The first power connector 131 is connected to a first power supply (for example, a battery) 111. Power of the first power supply 111 is supplied to the first winding set 801 via the power supply connector 131, a power supply relay 141, the first motor drive circuit 701 and a first motor relay 731. The power of the first power supply 111 is also supplied to the first microcomputer 401 and sensors of the first system GR 1.

The second power connector 132 is connected to a second power supply (for example, a battery) 112. Power of the second power supply 112 is supplied to the second winding set 802 via the power supply connector 132, a power supply relay 142, the second motor drive circuit 702 and a second motor relay 732. The power of the second power supply 112 is also supplied to the second microcomputer 402 and sensors of the second system GR 2. In case the power supplies are not provided redundantly, the two power supply connectors 131 and 132 may be connected to a common power supply.

In case CAN (controller area network) is redundantly provided as a vehicle communication network, the first vehicle communication connector 311 is connected between a first CAN 301 and a first vehicle communication circuit 321 and the second vehicle communication connector 312 is connected between a second CAN 302 and a second vehicle communication circuit 322. In case the CANs are not provided redundantly, the vehicle communication connectors 311 and 312 may be connected to a common CAN 30. As a vehicle communication network other than CAN, a network of any standard such as CAN-FD (CAN with Flexible Data rate) or FlexRay may be used. The vehicle communication circuits 321 and 322 bi-directionally communicate information with the microcomputer 401 of the first system and the microcomputer 402 of the second system.

The first torque connector 331 is connected between the first torque sensor 931 and a first torque sensor input circuit 341. The first torque sensor input circuit 341 notifies the first microcomputer 401 of the steering torque trq1 detected by the first torque sensor 931. The second torque connector 332 is connected between the second torque sensor 932 and a second torque sensor input circuit 342. The second torque sensor input circuit 342 notifies the second microcomputer 402 of the steering torque trq2 detected by the second torque sensor 932.

The microcomputers 401 and 402 calculate current command values and current limit values for the currents that are supplied to the winding sets 801 and 802. The current command value is a control amount command value for a control amount related to motor drive control, and the current limit value is a control amount limit value that is an upper limit of the control amount command value. Then, the first and second microcomputers 401 and 402 output first and second motor drive signals Dr1 and Dr2 generated based on the current command values and the current limit values to the motor drive circuits 701 and 702, respectively. Various processing in the microcomputers 401 and 402 may be software processing of a computer program stored in a tangible memory device such as a ROM and executed by a CPU, or may be hardware processing executed by special discrete electronic circuits. Hereinafter, the microcomputer of the own system is referred to as an own microcomputer, and the microcomputer of the other system is referred to as the other microcomputer.

The first microcomputer 401 generates the first motor drive signal Dr1 for controlling the operation of the switching elements 241 of the first motor drive circuit 701 and outputs it to the first motor drive circuit 701. In addition, the first microcomputer 401 generates a first power supply relay drive signal Vpr1 and a first motor relay drive signal Vmr1. The second microcomputer 402 generates the motor drive signal Dr2 for controlling the operation of the switching elements 242 of the second motor drive circuit 702 and outputs it to the second motor drive circuit 702. In addition, the second microcomputer 402 generates a second power supply relay drive signal Vpr2 and a second motor relay drive signal Vmr2. The power supply relay drive signals Vpr1 and Vpr2 generated by the microcomputers 401 and 402 are supplied to the power supply relays 141 and 142, respectively.

Figure 7:
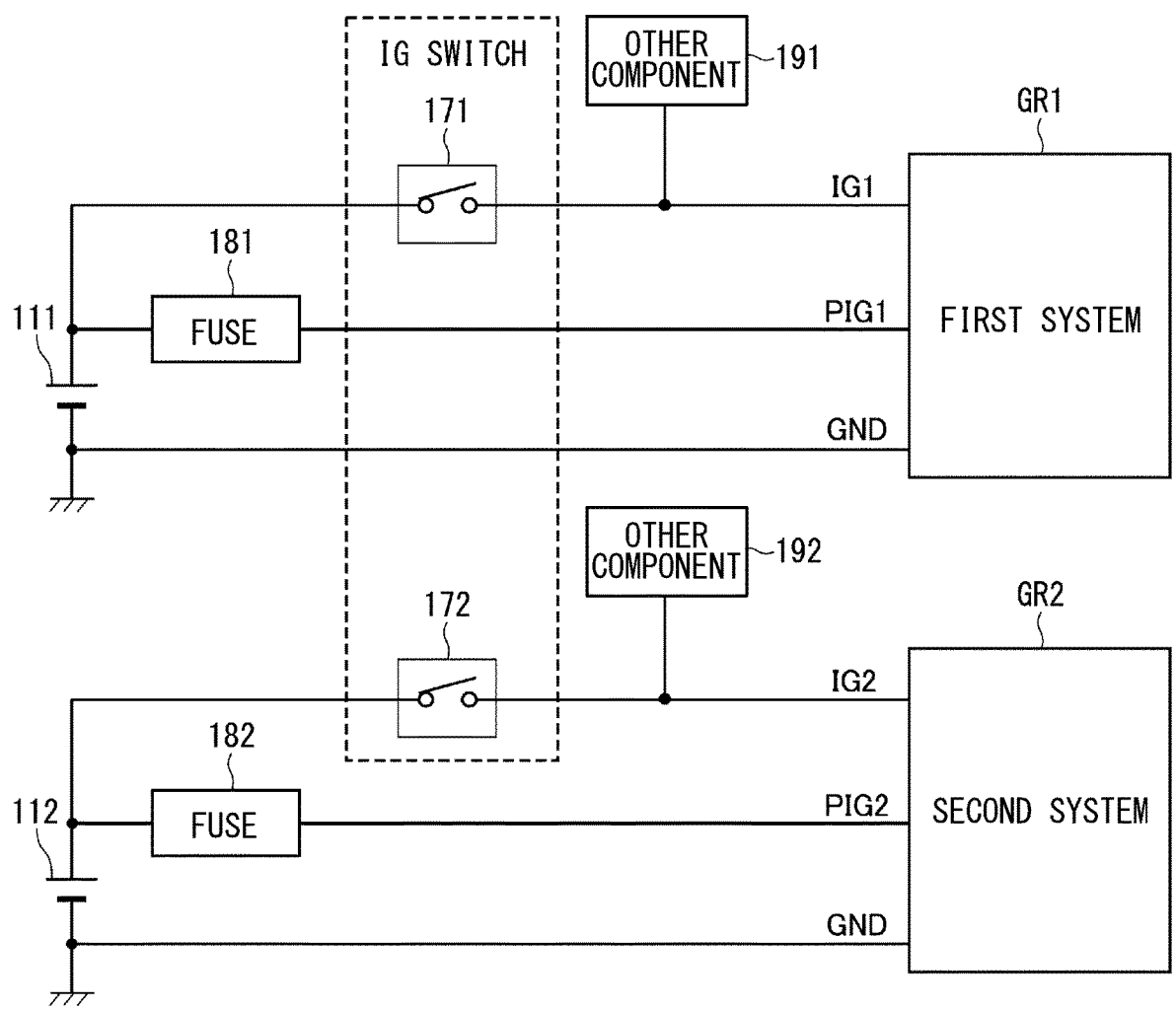
FIG. 7 is a schematic diagram of a configuration example of an IG switch.

The microcomputers 401 and 402 include IG-OFF check units 411 and 412 as OFF check units and inter-microcomputer communication units 421 and 422, respectively. The IG-OFF check units 411 and 412 correspond to IG-OFF check processing, which determine that the IG-OFF determination is made when the IG switches 171 and 172 illustrated in FIG. 7 are turned off, respectively, and a predetermined condition is satisfied. As the predetermined condition, an IG voltage is lowered to a threshold voltage, an occurrence of communication abnormality such as CAN communication interruption or the like is used. Details of the IG-OFF check processing will be described later. The inter-microcomputer communication units 421 and 422 correspond to inter-microcomputer communication processing, which transmit and receive between the own microcomputer and the other microcomputer at least information as an IG-OFF determination signal indicating that the IG-OFF determination has been made.

The inter-microcomputer communication units 421 and 422 are configured to mutually transmit and receive information by inter-microcomputer communication between the first and second microcomputers 401 and 402. The inter-microcomputer communication units 421 and 422 mutually transmit and receive the current command values, the current limit values and the like, and drive the motor 80 by cooperating the first system GR1 and the second system GR2. A communication frame for the inter-microcomputer communication includes the current command value, the current limit value, the current detection value and the like. In addition, there may be an update counter value, a status signal, a CRC signal that is an error detection value signal, a checksum signal and the like.

In case that one microcomputer does not receive signals from the other microcomputer via the inter-microcomputer communication although it receives the power supply relay drive signal Vpr1, Vpr2 from the other microcomputer, the other microcomputer is determined to be normal and the inter-microcomputer communication between the microcomputers is determined to be abnormal. On the other hand, in case that one microcomputer does not receive the power supply relay drive signal Vpr1, Vpr2 from the other microcomputer and does not receive the signal from the other microcomputer through the inter-microcomputer communication, the other microcomputer is determined to be abnormal.

The first and second motor drive circuits 701 and 702 are provided in correspondence to the first and second winding sets 801 and 802. The first motor drive circuit 701 is a three-phase inverter having a plurality of switching elements 241 and converts electric power to be supplied to the first winding set 801. The switching elements 241 of the first motor drive circuit 701 are controlled to turn on and off based on the motor drive signal Dr1 output from the first microcomputer 401. The second motor drive circuit 702 is also a three-phase inverter having a plurality of switching elements 242 and converts electric power to be supplied to the second winding set 802. The switching elements 242 of the second motor drive circuit 702 are controlled to turn on and off based on the motor drive signal Dr2 output from the second microcomputer 402.

The power supply relays 141 and 142 are capable of shutting off the power supplied from the power supplies 111 and 112 to the motor drive circuits 701 and 702, respectively. The first power supply relay 141 is provided between the first power supply connector 131 and the first motor drive circuit 701 and is controlled by the first power supply relay drive signal Vpr1 output from the first microcomputer 401. When the first power supply relay 141 is in the on-state, current flow between the first power supply 111 and the first motor drive circuit 701 is permitted. When the first power supply relay 141 is in the off-state, the current flow between the first power supply 111 and the first motor drive circuit 701 is shut off.

The second power supply relay 142 is provided between the second power supply connector 132 and the second motor drive circuit 702 and is controlled by the second power supply relay drive signal Vpr2 output from the second microcomputer 402. When the second power supply relay 142 is in the on-state, current flow between the second power supply 112 and the second motor drive circuit 702 is permitted. When the second power supply relay 142 is in the off-state, the current flow between the second power supply 112 and the second motor drive circuit 702 is shut off.

The power supply relays 141 and 142 in the present embodiment are semiconductor relays such as MOSFETs. In case that the power supply relays 141 and 142 have parasitic diodes such as MOSFETs, it is preferable to provide a reverse connection protection relay (not shown) connected in series so that the parasitic diodes are reverse-connected relative to the power supply relays 141 and 142. Alternatively, the power supply relays 141 and 142 may be mechanical relays.

The first motor relay 731 is provided in a first power supply path of each phase between the first motor drive circuit 701 and the first winding set 801 and is controlled by a first motor relay drive signal Vmr1 output from the first microcomputer 401. The second motor relay 732 is provided in a second power supply path of each phase between the second motor drive circuit 702 and the second winding set 802 and is controlled by a second motor relay drive signal Vmr2 output from the second microcomputer 402. When the motor relays 731, 732 are in the on-state, current flow between the motor drive circuits 701, 702 and the winding sets 801, 802 is permitted, respectively. When the motor relays 731, 732 are in the off-state, the current flow between the motor drive circuits 701, 702 and the winding sets 801, 802 are interrupted, respectively.

A first current sensor 741 detects a first current Im1 which is supplied to each phase of the first winding set 801 and output a first detected value to the first microcomputer 401. The second current sensor 742 detects a second current Im2 which is supplied to each phase of the second winding set 802 and outputs a second detected value to the second microcomputer 402. In case first and second rotation angle sensors 251 and 252 are provided redundantly, the first rotation angle sensor 251 detects a first electrical angle θ1 of the motor 80 and outputs a first detected value to the first microcomputer 401. The second rotation angle sensor 252 detects a second electrical angle θ2 of the motor 80 and outputs a second detected value to the second microcomputer 402. In case that the rotation angle sensors are not provided redundantly, for example, the electrical angle θ2 of the second system may be calculated by an equation of θ2=θ1+30 based on the electrical angle θ1 of the first system detected by the first rotation angle sensor 251.

Next, a configuration example of the IG switch is described with reference to FIG. 7. The IG switches 171 and 172 switch between the on-state that is an operative state of the vehicle and the off-state that is an inoperative state of the vehicle. A power supply line IG1 and a power cable line PIG1 are connected in parallel between the first power supply 111 and the first system GR1. The first IG switch 171 is provided in the middle of the power supply line IG1, and a fuse 181 is provided in the middle of the power supply cable PIG1. In addition to being connected to the first system GR1, the power supply line IG1 is branched and connected to the other component 191. The first power supply 111 and the first system GR1 share the ground GND.

Similarly, a power supply line IG2 and a power cable line PIG2 are connected in parallel between the first power supply 111 to the first system GR1. The second IG switch 172 is provided in the middle of the power supply line IG2, and a fuse 182 is provided in the middle of the power cable line PIG2. In addition to being connected to the second system GR2, the power supply line IG2 is branched and connected to the other component 192. The second power supply 112 and the second system GR2 share the ground GND.

As described above, in the configuration example of FIG. 7, the IG switches 171 and 172 are provided to the respective systems GR1 and GR2 equally. In another configuration example, two power supplies may be configured by a main power supply and a sub-power supply, and two IG switches may be provided in the middle of power supply lines IG1 and IG2 that are branched from the main power supply side and connected to each system.

Further, the main power supply and the sub-power supply may be provided switchably.

Figure 8A:
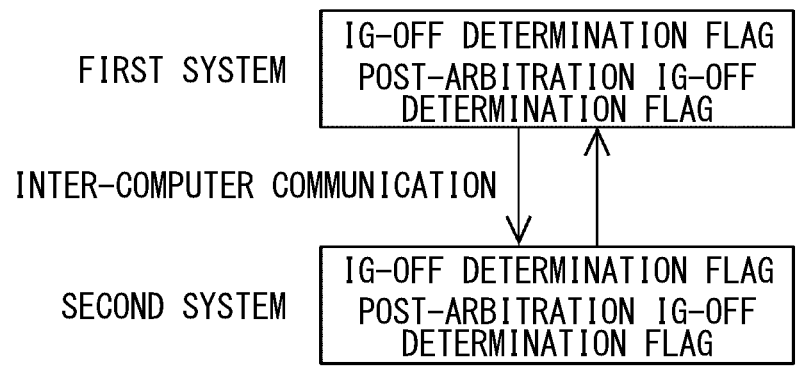
FIG. 8A is a configuration diagram of an inter-microcomputer communication between microcomputers.

Further, configuration of the inter-microcomputer communication is described with reference to FIG. 8A. The inter-microcomputer communication unit 421 of the first system and the inter-microcomputer communication unit 422 of the second system mutually transmit and receive an IG-OFF determination flag indicating a determination result by the IG-OFF check units 411 and 412 and a post-arbitration IG-OFF determination flag. The IG-OFF determination flag is a flag indicating a result of individual determination by each microcomputer that the IG switch 171, 172 provided on the power supply line input to the own system is turned off. The post-arbitration IG-OFF determination flag is a flag indicating that the IG-OFF determination is confirmed in both microcomputers, that is, the IG-OFF determinations are made in the redundant system (first and second systems).

When the IG-OFF determination flag of the own microcomputer is changed from OFF to ON, the inter-microcomputer communication unit 421, 422 transmits the IG-OFF determination signal to the other microcomputer. When the post-arbitration IG-OFF determination flag of the own microcomputer is turned from OFF to ON, the post-arbitration IG-OFF determination signal is transmitted to the other microcomputer.

Figure 8B:
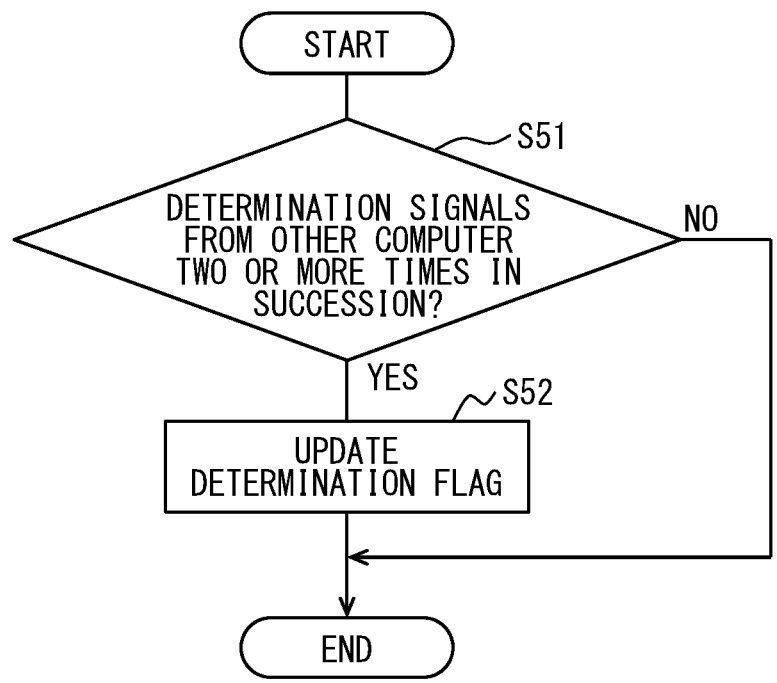
FIG. 8B is a flowchart illustrating reception processing of a determination signal from the other microcomputer.

Next, with reference to a flowchart of FIG. 8B, processing for receiving a determination signal from the other microcomputer in the inter-microcomputer communication between microcomputers will be described. In the following flowchart, a symbol S indicates a processing step. In S51, the microcomputer communication unit 421, 422 of each microcomputer checks whether or not the IG-OFF determination signal or the post-arbitration IG-OFF determination signal has been received twice or more in succession from the other microcomputer. In case of YES in S51, the microcomputer communication unit 421, 422 of each microcomputer validates the received signal and update the determination flag in S52. On the other hand, if the determination signal is received only once and is not received twice in succession, it is determined NO in S51. In this case, the reception processing is terminated without updating the determination flag.

As a result, erroneous determination due to communication data abnormality, that is, RAM corruption, can be prevented. A time period for successive reception is set according to the communication cycle of the inter-microcomputer communication executed between the microcomputers. Further, in a system that requires high reliability, the number of receptions determined as successive reception may be set to a predetermined number, which may be three or more. On the other hand, in a system that does not have a possibility of communication data abnormality, the determination flag may be updated in response to only one reception.

Figure 10:
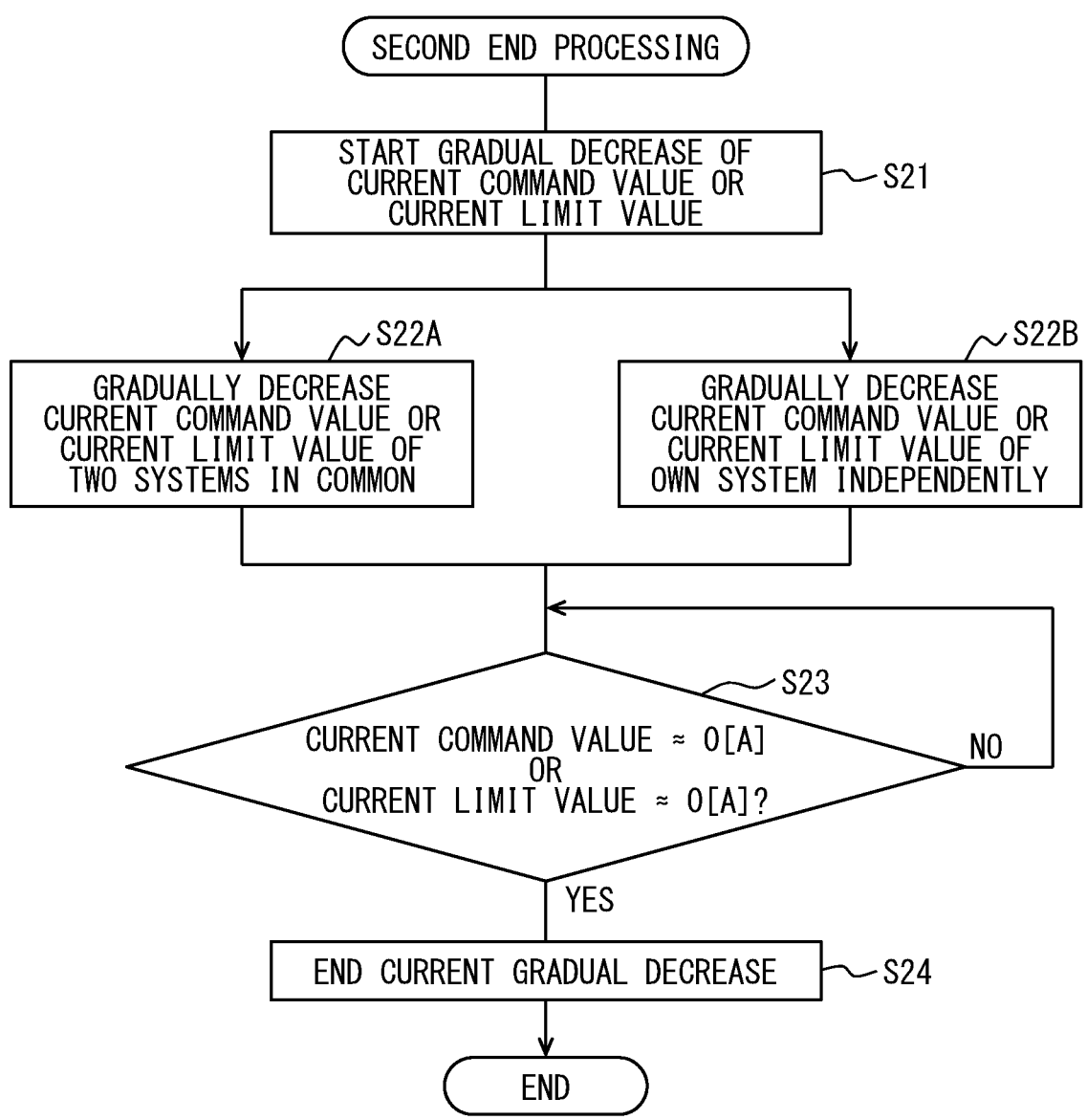
FIG. 10 is a sub-flowchart of second end processing (gradual current decrease) in FIG. 9.
Figure 11:
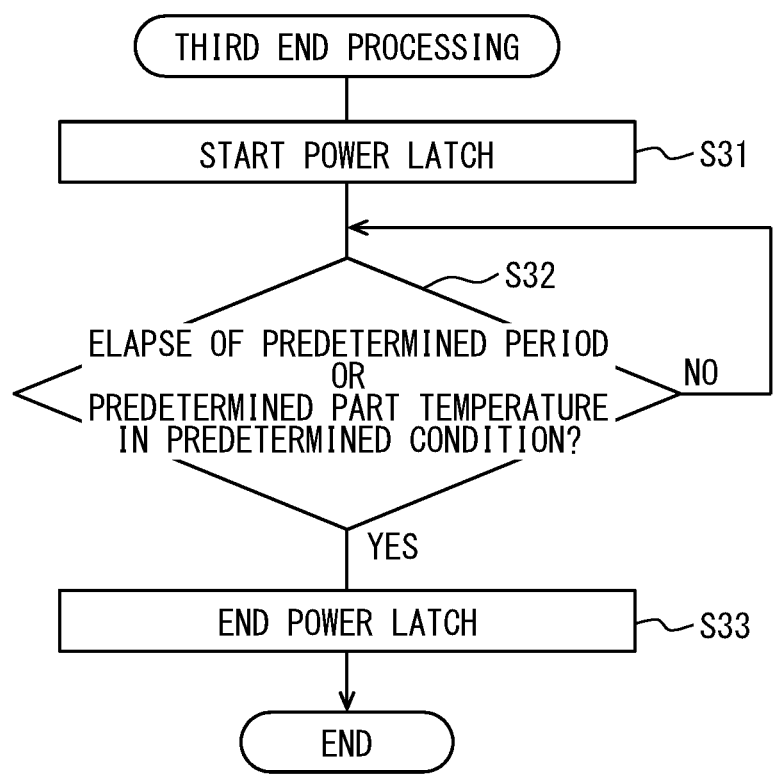
FIG. 11 is a sub-flowchart of third end processing (power latch) in FIG. 9.
Figure 12:
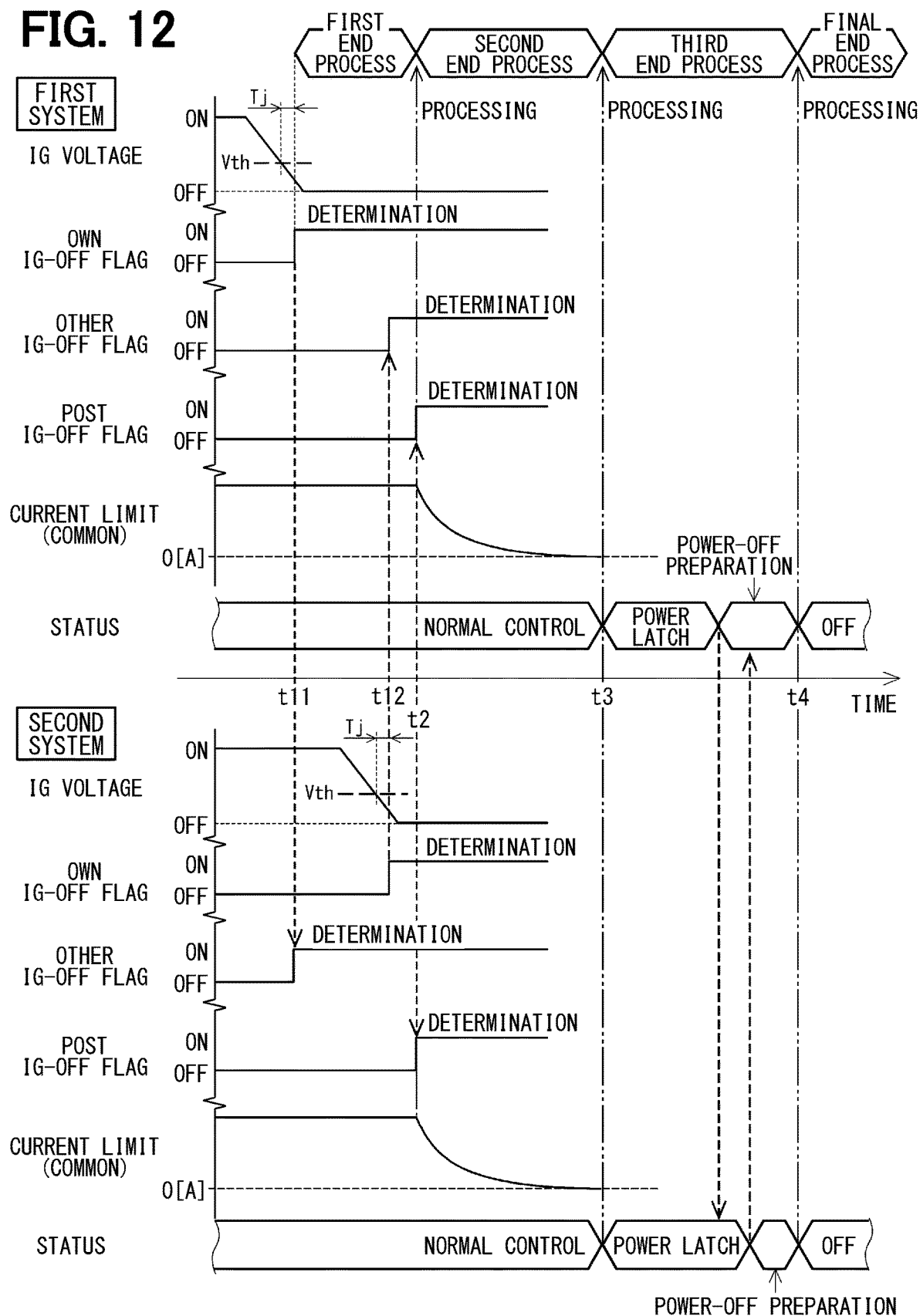
FIG. 12 is a time chart of basic processing corresponding to FIG. 9 to FIG. 11.

Next, basic processing according to the present embodiment will be described with reference to flowcharts of FIG. 9 to FIG. 11 and a time chart of FIG. 12. In the following flowcharts, steps that are substantially the same as the steps described above are given the same reference numbers in principle, and description thereof will be omitted as appropriate. Further, in the following flowcharts excluding FIG. 17, the part where the determination signal is described as "reception" means "successive reception" based on the processing of FIG. 8B. In FIG. 12, the success or failure of each checking is represented as ON or OFF of a flag, and the determination signal is indicated with a dashed arrow.

Figure 9:
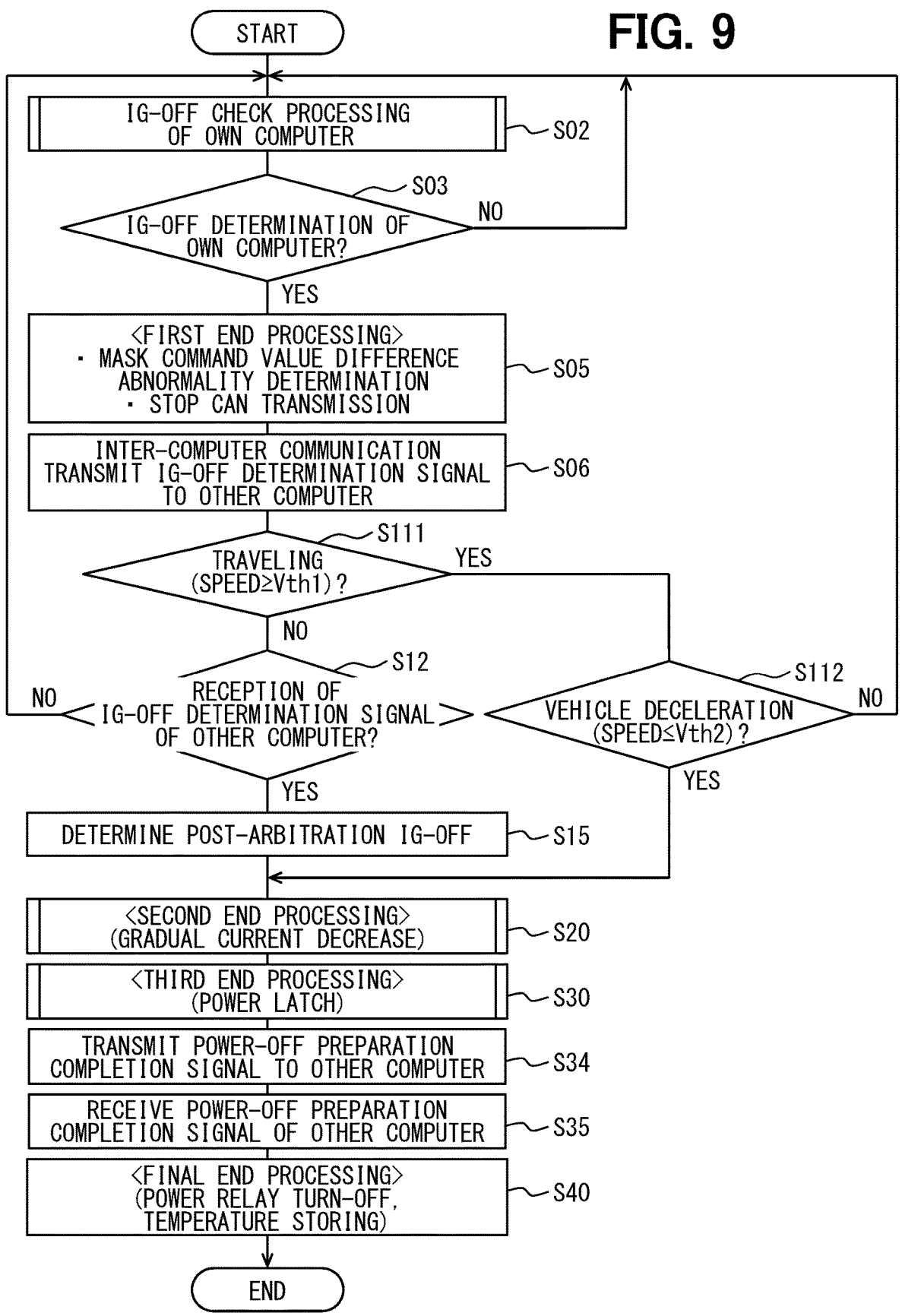
FIG. 9 is a flowchart of basic processing executed during an IG-OFF period according to one embodiment.

In S02 of FIG. 9, it is checked whether the own microcomputer is in the IG-OFF state. Specifically, as shown in FIG. 12, it is determined that the IG switch has been turned off when an IG voltage continues to be lower than a threshold voltage Vth (for example, several volts) for a determination period Tj (for example, several milliseconds). In S03, it is checked whether the IG-OFF determination of the microcomputer is made. If NO, the processing returns to S02. In FIG. 12, it is assumed that the IG-OFF determination of the first system is made at time t11, and then the IG-OFF determination of the second system is made at time t12.

If YES in S03, the own microcomputer executes a first end processing as a first stage of the end processing in 505. For example, a command value difference abnormality determination that is regarded as abnormal when the difference between the current command values of the two systems is equal to or larger than a predetermined value is masked, that is, invalidated. That is, when the command value difference is caused as a result of gradually decreasing the current command value of only one system as a normal measure, it is prohibited that such a situation is erroneously determined to be abnormal. Moreover, the CAN transmission which is vehicle-mounted communication is stopped. Further, processing such as prohibition of vehicle coordinated control and masking of a failure other than masking of the command value difference abnormality determination may be executed.

In step S06, the own microcomputer transmits information indicating that the IG-OFF determination has been made to the other microcomputer as the IG-OFF determination signal through the inter-microcomputer communication. In S111, it is checked whether the vehicle is traveling, specifically, whether a vehicle speed is equal to or higher than a first speed threshold value Vth1 (for example, 30 [km/H]). If YES, the processing proceeds to S112. In S112, it is then checked whether the vehicle speed has decreased, specifically, whether the vehicle speed has decreased to a state equal to or lower than a second speed threshold value Vth2 (for example, 5 [km/H]) lower than the first speed threshold value Vth1. The vehicle speed may be acquired continuously or may be acquired, for example, after a predetermined period has elapsed since the IG-OFF determination has been made, and compared with the second speed threshold value Vth2.

In case of YES in S112, it is considered that the vehicle has decelerated from the traveling state to an almost stopped state, and second end processing of S20 is executed without executing S12 and S15 which follow S111. Thereby, at the time of IG-OFF during traveling, it is possible to move to gradual decrease of electric current by only the determination of the own microcomputer after confirming that the vehicle has stopped substantially. Alternatively, S12 may be executed always after S06 without executing exceptional processing of S111 and S112 during traveling.

If NO in S111, the own microcomputer checks in S12 whether it has received the IG-OFF determination signal from the other microcomputer. If YES in S12, it is determined in S15 that the post-arbitration IG-OFF determination is made, and the processing proceeds to the second end processing in S20. In FIG. 12, it is assumed that the post-arbitration IG-OFF determination is made at time t2, and the second end processing is started. It is noted that the timing t2 of transmission/reception of the post-arbitration IG-OFF determination signal, which will be described later, is simplified, and is indicated by broken arrows in both directions. If NO in S12, the processing returns to S02.

In the second end processing, both microcomputers gradually decrease the current command value or the current limit value that is the upper limit of the current command value from the current value, and stop driving the motor 80. In S21 of FIG. 10, the gradual decrease of the current command value or the current limit value is started. As the gradual reduction method, S22A or S22B is selected. In S22A, both microcomputers share the same current command value or current limit value and gradually decrease them. In S22B, each microcomputer gradually decreases the current command value or current limit value of its own system independently from the other system. In the example of FIG. 12, the current limit values of the two systems are the same and gradually decreased in common.

If it is determined in S23 that the current command value or the current limit value has reached 0 [A], it is determined in S24 that the gradual current reduction has been completed. It is noted that 0 [A] may be set to a value that is substantially regarded as 0 [A] in consideration of the resolution and detection error of the device. Moreover, the predetermined current values may be determined to be other than 0 [A]. At this time, driving of the motor 80 is substantially stopped, and the assist operation in the EPS is stopped. Here, by sharing the current command value or the current limit value in common and gradually decreasing such values in S22A, the timing when the current command value or the current limit value of both systems becomes 0 [A] can be matched, that is, synchronized. In the example of FIG. 12, it is assumed that the second end processing is completed at time t3. In addition, the completion timing of gradual current decrease may be synchronized even in case that the current command value or the current limit value is gradually decreased independently in S22B.

When the second end processing is completed, each microcomputer proceeds to third end processing of S30. The third end processing is a power latch. This processing holds a control power supply for the microcomputer to continue a temperature estimation calculation of the elements on the circuit board (substrate) after the drive current is stopped. In S31 of FIG. 11, each microcomputer starts the power latch. In S32, it is checked whether a predetermined period has elapsed or whether the temperature of a predetermined part satisfies a predetermined condition. For example, it is checked whether the temperature of the switching element on the substrate has decreased to a predetermined value or less. If YES in S32, each microcomputer completes the third end processing, that is, the power latch.

After the third end processing, the own microcomputer transmits a power-off preparation completion signal to the other microcomputer through the inter-microcomputer communication in S34. When the own microcomputer receives the power-off preparation completion of the other microcomputer in S35, the processing proceeds to a final end processing in S40. In the example of FIG. 12, it is assumed that the power-off preparation for both of the first system and the second system is completed at time t4, and the processing proceeds to the final end processing. In the final end processing, the power supply relays 141 and 142 are turned off, and the temperature are stored. It is noted that the configuration is not limited to a configuration in which a plurality of power supply relays individually provided for each system is turned off, and one power supply relay provided in common to each system may be turned off.

The operation and effect of the basic processing will be described next. If the timing of IG-OFF determination is different between the two systems of microcomputers, problems such as variations and sudden changes in assist torque as well as erroneous determination of failure may occur when the assist operation is stopped, that is, when driving of the steering assist motor is stopped. For example, in case the current command value and the current limit value are shared in common in the second end processing, the assist operation of both systems is always stopped by the IG-OFF determination of one system, the IG-OFF determination is made first. In addition, in case that the current command value and the current limit value are not shared, a variation in the current that is passed from the motor drive circuits 701, 702 to the winding sets 801, 802 occurs due to a shift in timing when these values become 0. As a result, assist fluctuation occurs. Furthermore, if the timings of the final end processing of both systems do not coincide, there is a possibility that the microcomputer of the system that stops later will erroneously detect an abnormality of the system that has been stopped first, or a communication abnormality may occur.

Therefore, in the basic processing of the present embodiment, in the second end processing and the final end processing, the microcomputer of the system, which makes the IG-OFF determination first, waits for the operation of the microcomputer of the other system in order to match the operation timings of both systems. In the second end processing, the microcomputers of both systems share the current limit value to match the operation timing, thereby preventing fluctuation or sudden change in the motor output (assist torque in EPS), error in failure determination and the like. In addition, by making the timing of the final end processing coincide with each other, it is possible to avoid erroneous detection and communication abnormality.

On the other hand, there is no problem with the first end processing and the third end processing even if the timings of both systems are shifted. Therefore, each microcomputer can shorten the overall processing time by proceeding with the first end processing and the third end processing based on the determination of only the own microcomputer.

In the above basic processing, the third end processing (power latch) of S30 may not be executed. In that case, after gradually decreasing the current in the second end processing is completed, the processing proceeds to the final end processing. When the third end processing is not executed, it is preferred to synchronize the timings of gradual current decreasing by the second end processing and shift to the final end processing at the same time for both systems.

As described above, the motor control apparatus according to the present embodiment divides the processing required when the IG-OFF determination of the own system is made and the stop processing executed when the IG-OFF determination as the redundant system is made as a result of the post-arbitration IG-OFF determination. Thereby, it is possible to appropriately ensure the same operations of both systems when the IG switches 171 and 172 are turned off.

Next, various processing executed in addition to the basic processing described above will be described with reference to flowcharts of FIG. 13 to FIG. 22. It is noted that in FIG. 13 to FIG. 22, descriptions of processing other than the specific processing that overlap with the basic processing or the processing shown in other figures are omitted as appropriate.

<IG-OFF Check Processing Before Starting Assist Operation>

Figure 13:
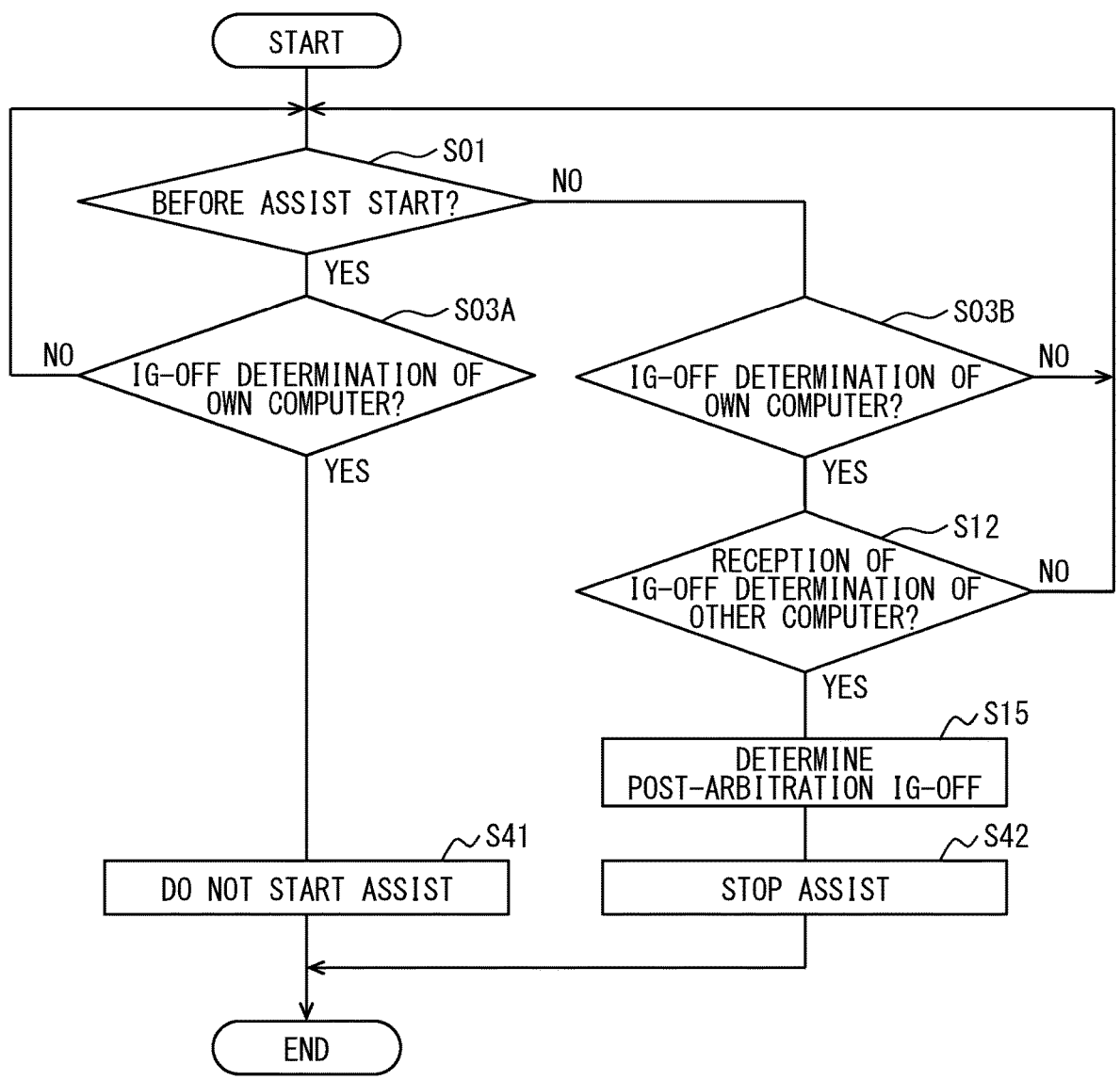
FIG. 13 is a flowchart of IG-OFF check processing before starting an assist operation.

In S01 of FIG. 13, it is checked whether it is before starting the assist operation. If YES in S01, it is checked in S03A whether the IG-OFF determination of the own microcomputer has been made. In case of YES in S03A, the own microcomputer does not start the assist operation in S41 based on the fact that the IG-OFF determination of the own microcomputer has been made regardless of the determination result of the other microcomputer. Thereby, it is possible to avoid starting of the assist operation against the driver's intention. If NO in S03A, the processing returns to S01.

If NO in S01, that is, during the assist operation, it is checked in S03B whether the IG-OFF determination of the own microcomputer has been made, and it is checked in S12 whether the IG-OFF determination signal of the other microcomputer has been received. If YES in 503B and S12, the own microcomputer determines in S15 that the post-arbitration IG-OFF determination is made, and stops the assist operation in S42. If NO in S03 or S12, the processing returns to S01.

<Processing at Time of Inter-Microcomputer Communication Interruption and Processing Based on Post-Arbitration IG-OFF Determination Signal>

Figure 14:
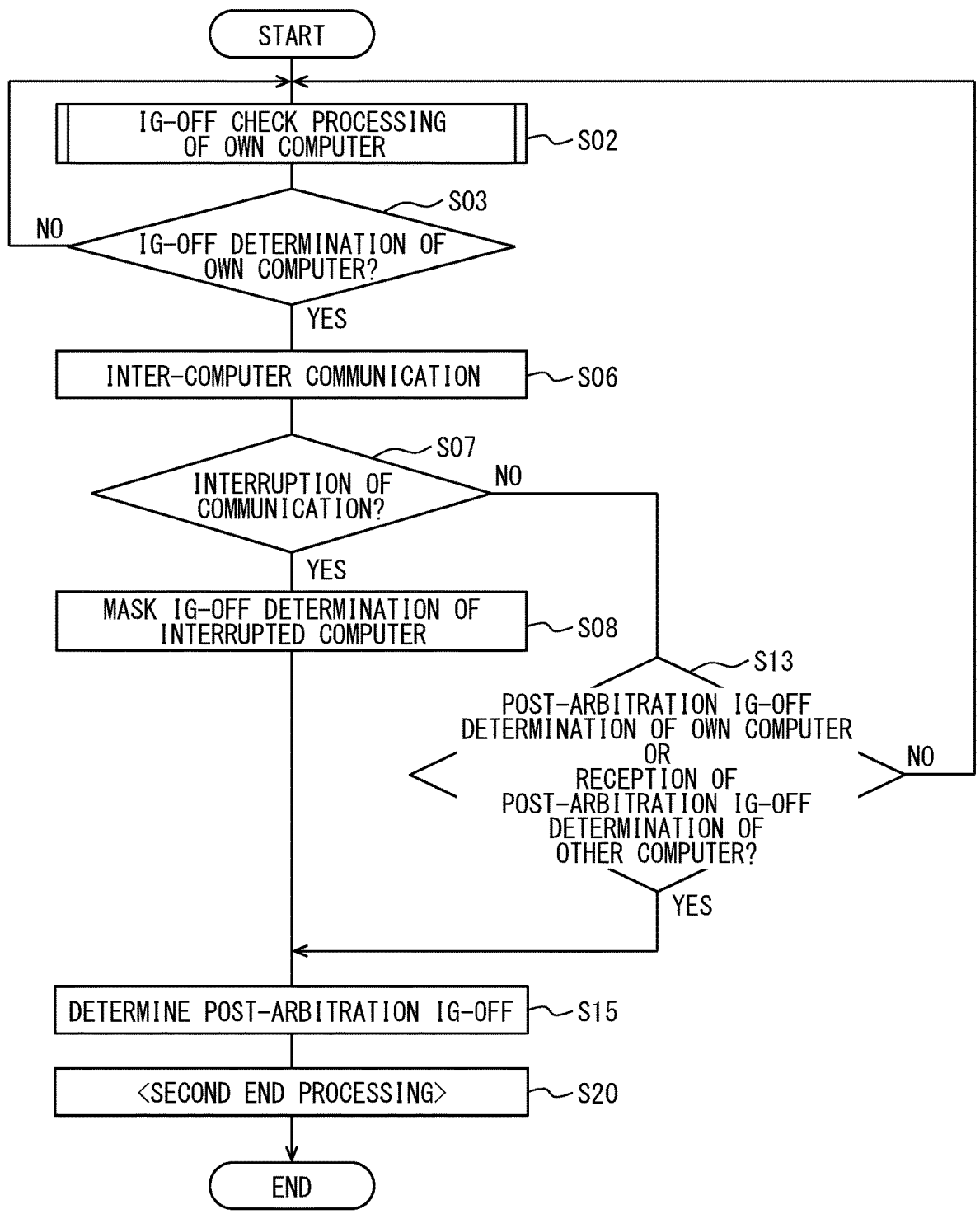
FIG. 14 is a flowchart of processing executed when inter-microcomputer communication is interrupted and processing executed based on a post-arbitration IG-OFF determination signal.

S02, S03 and S06 in FIG. 14 are the same as the basic processing. In S07, it is checked whether the inter-microcomputer communication has been interrupted. In case of YES in S07, the own microcomputer masks, that is, invalidates the IG-OFF determination signal of the interrupted microcomputer in S08. Then, based on only YES in IG-OFF determination of own microcomputer which is a YES determination in S03, it is determined in S15 that the post-arbitration IG-OFF determination is made, and the second end processing is started in S20. Thereby, the assist stop processing can be advanced only by the determination of the own microcomputer when the abnormality of the inter-microcomputer communication interruption occurs.

On the other hand, if the inter-microcomputer communication is normal and the check result in S07 is NO, it is checked in S13 whether the post-arbitration IG-OFF determination has been made in the own microcomputer, or whether the post-arbitration IG-OFF determination signal has been received from the other microcomputer. If YES in S13, it is determined in S15 that the post-arbitration IG-OFF determination has been made, and the second end processing is started in S20. If NO in S13, the processing returns to S02.

For example, it is assumed that after the own microcomputer is turned off from the IG-ON state, the own microcomputer is turned on again quickly before the IG-OFF determination of the other microcomputer is made. In this case, there is a possibility that a state transition shift occurs at the determination timing of the microcomputers of both systems, and only one of the microcomputers makes the OFF determination. Then, it is likely that both systems may stop driving due to stopping of driving the system which made the OFF determination. Therefore, by starting the second end processing on condition that the post-arbitration IG-OFF determination signal is received from the other microcomputer, it is thus possible to avoid the state transition difference between both microcomputers.

<Gradual Current Limit Value Increase Processing at Time of Re-Determination of IG-ON>

Figure 15:
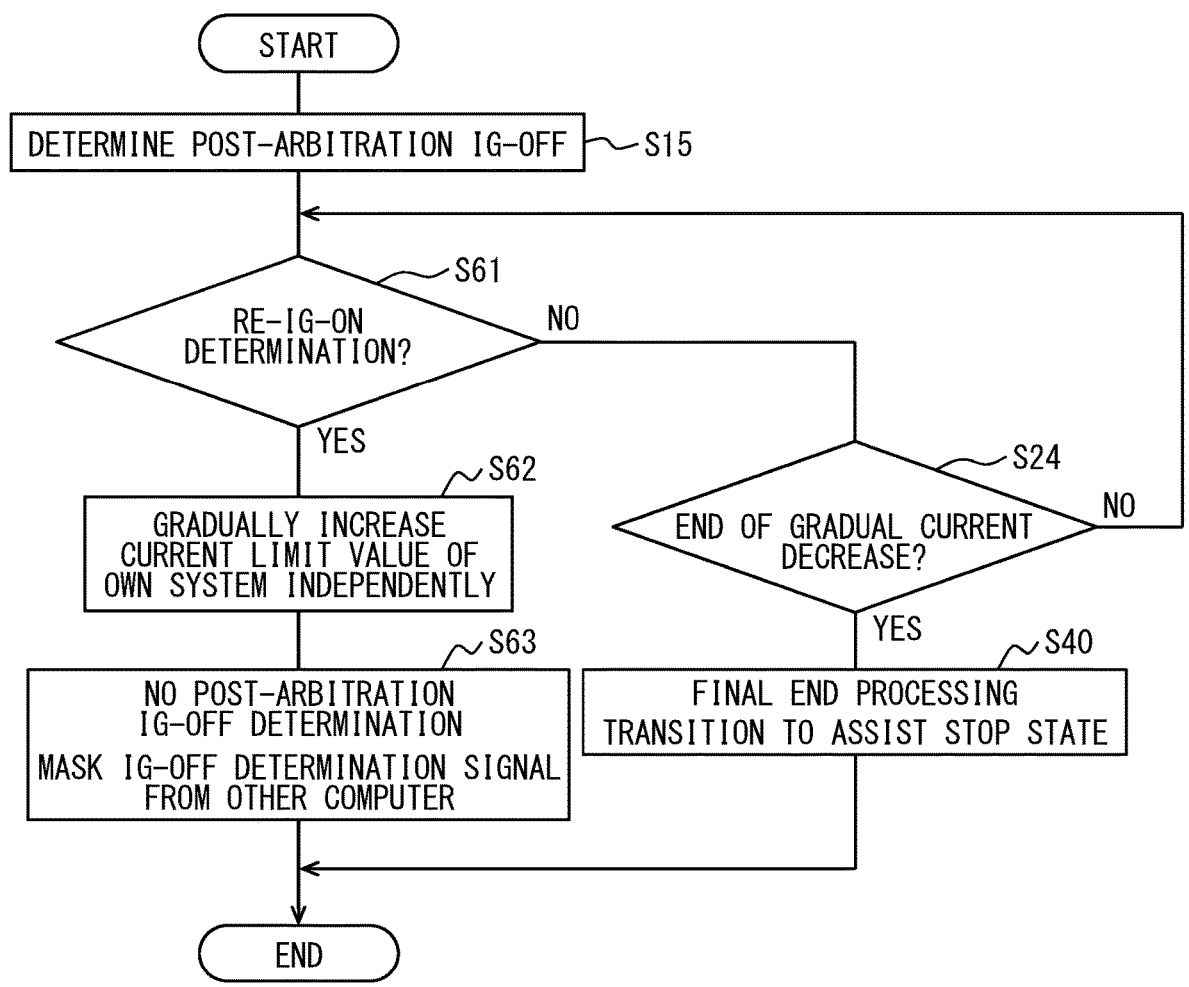
FIG. 15 is a flowchart of current limit value gradual increase processing when an IG-ON determination is made again.

Processing of FIG. 15 starts when the post-arbitration IG-OFF determination is made in S15. Thereafter, in S61, it is checked whether a re-IG-ON determination indicating that the IG switch has been turned on again has been made in the own microcomputer. If YES in S61, the own microcomputer gradually increases the current limit value of the own system independently in S62. Further, in S63, the own microcomputer makes no post-arbitration IG-OFF determination by invalidating the post-arbitration IG-OFF determination, and masks the IG-OFF determination signal received from the other microcomputer. Thus, the assist operation which is about to be stopped can be gradually restored and returned by increasing the motor current as intended by the driver. In S62, the current command value of the own system may be gradually increased instead of the current limit value.

On the other hand, if NO in S61, that is, if the IG switch 171, 172 is not turned on again after the IG switch 171, 172 is turned off, it is checked in S24 whether the gradual current reduction by the second end processing is completed. If YES in S24, final end processing is executed in S40, and the processing proceeds to the assist stop state. If NO in S24, the processing returns to S61.

<Wait Time Setting Processing after IG-OFF Determination>

Figure 16:
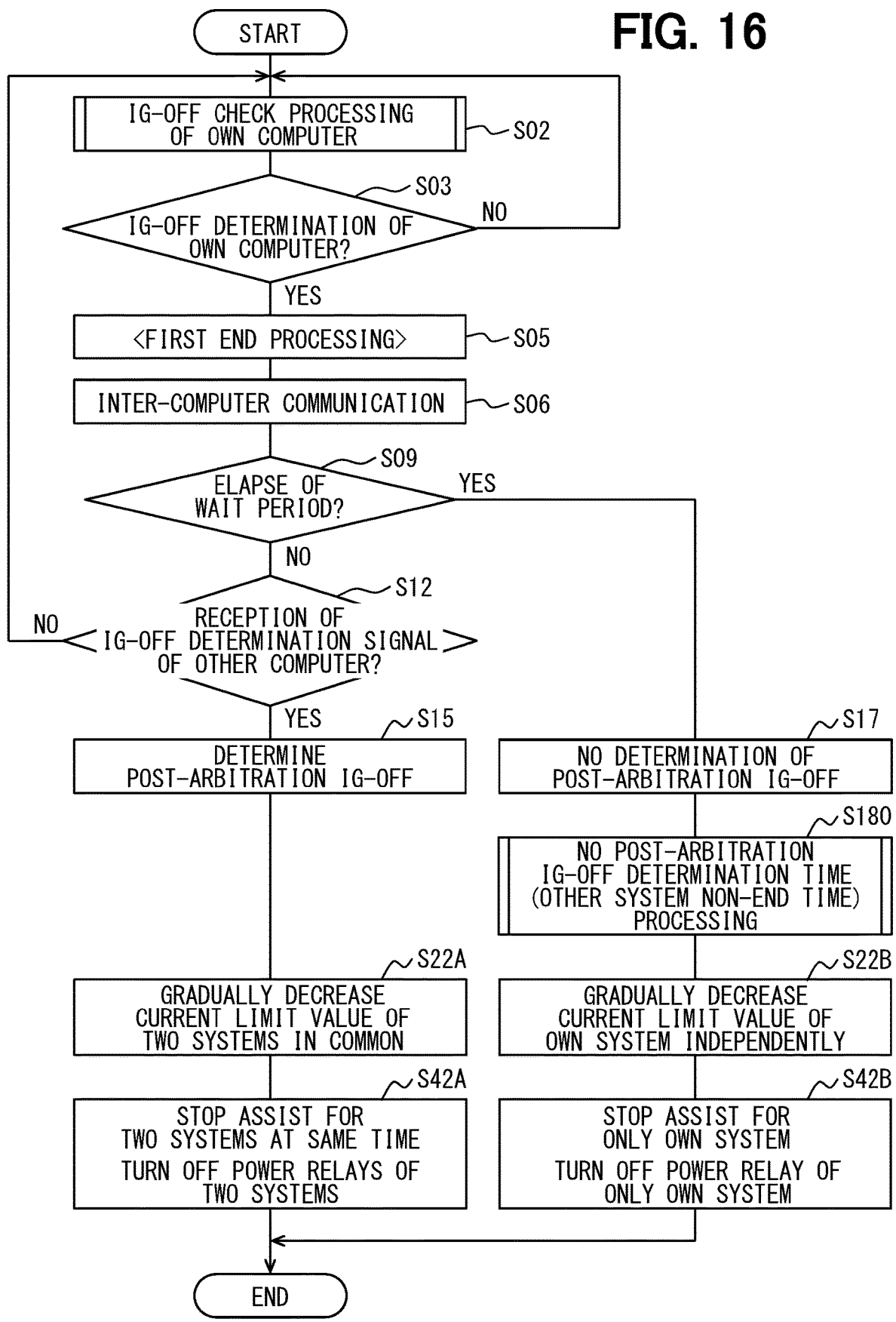
FIG. 16 is a flowchart of processing for setting a wait period after the IG-OFF determination.

Next, with reference to FIG. 16 to FIG. 22, processing for setting the wait time after the IG-OFF determination is made will be described. S02 to S06 in FIG. 16 are the same as the basic processing. In S09, it is checked whether a predetermined wait period has elapsed after the IG-OFF determination of the own microcomputer. In S12, it is checked whether the IG-OFF determination signal of the other microcomputer has been received. If the IG-OFF determination signal from the other microcomputer has been received within the wait period, S09 results in NO and S12 results in YES.

In this case, it is determined in S15 that the post-arbitration IG-OFF determination is made. In S22A, both microcomputers share the same current limit value (or current command value) in common and gradually decrease such a value as the second end processing. In S42A, the two system stop assisting simultaneously. As shown in FIG. 9 and FIG. 12, after the power latch period has elapsed, the two power supply relays 141 and 142 are turned off as the final end processing.

If the IG-OFF determination signal from the other microcomputer is not received within the wait period, that is, the predetermined period elapses before the reception of the IG-OFF determination signal of the other microcomputer, S09 results in YES. In this case, the own microcomputer does not make the post-arbitration IG-OFF determination in S17, and in S180 executes processing at no post-arbitration IG-OFF determination. Hereinafter, no determination of the post-arbitration IG-OFF is referred to as a determination of no-end state of the other system from the viewpoint of the own microcomputer. That is, no determination of the post-arbitration IG-OFF is synonymous with a determination of no-end state of the other system. A detailed processing example of S180 will be described later.

Thereafter, in S22B, the own microcomputer gradually decreases the current limit value (or current command value) of the own system independently. In S42B, only the own system stops the assist operation. In this case, after the elapse of the predetermined period corresponding to the power latch period, only the power supply relay of the own system is turned off. As a result, since the assist operation is stopped based on only the IG-OFF determination of the own microcomputer without endlessly waiting for the IG-OFF determination of the other microcomputer, a delay in processing can be prevented. The significance of gradually decreasing the current limit value independently in 522B will be described later.

Figure 17:
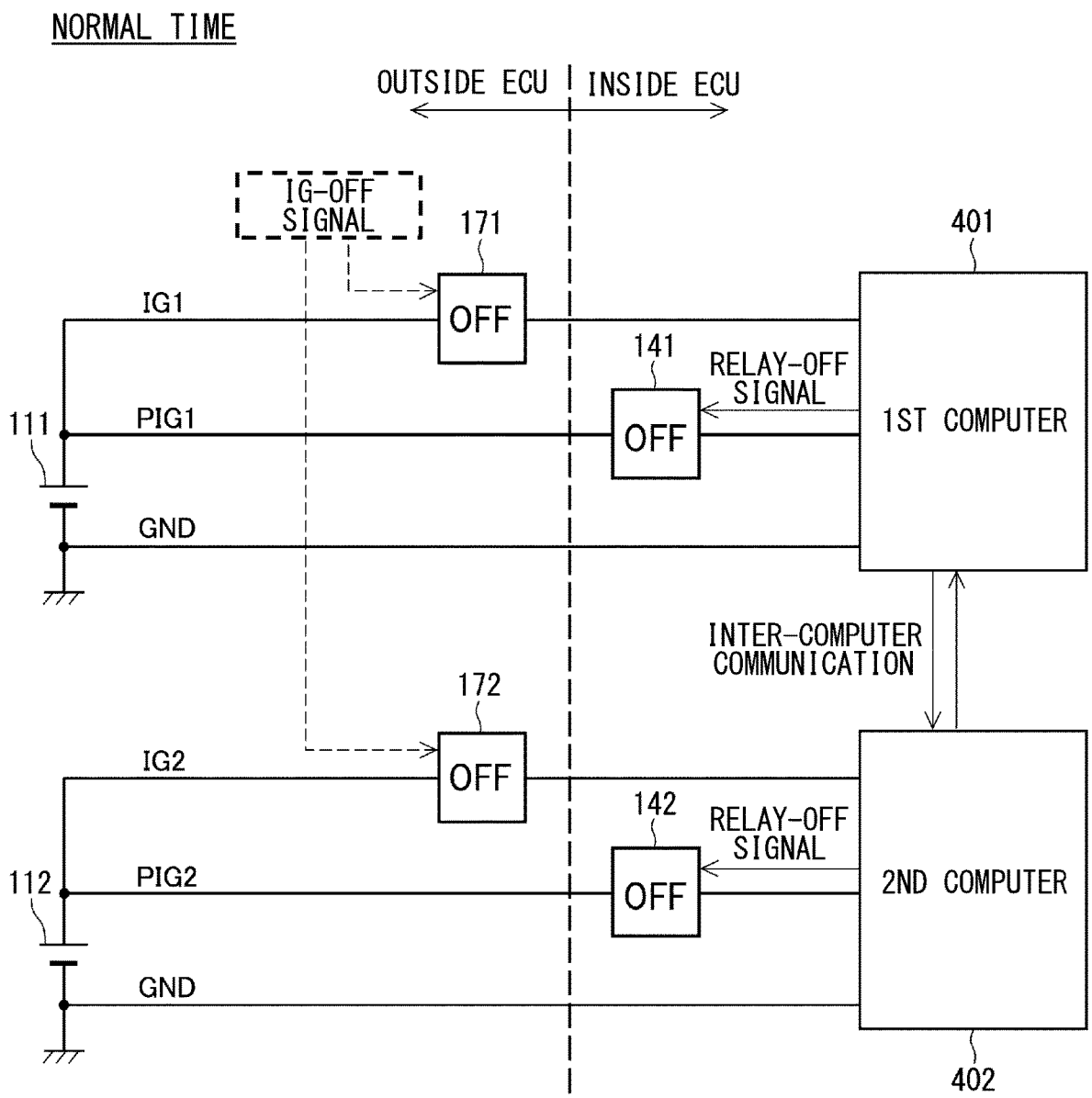
FIG. 17 is a diagram illustrating a normal state in which an example event that the IG-OFF determination is not made after arbitration (other system is not completed and not in an end state) is illustrated.
Figure 18:
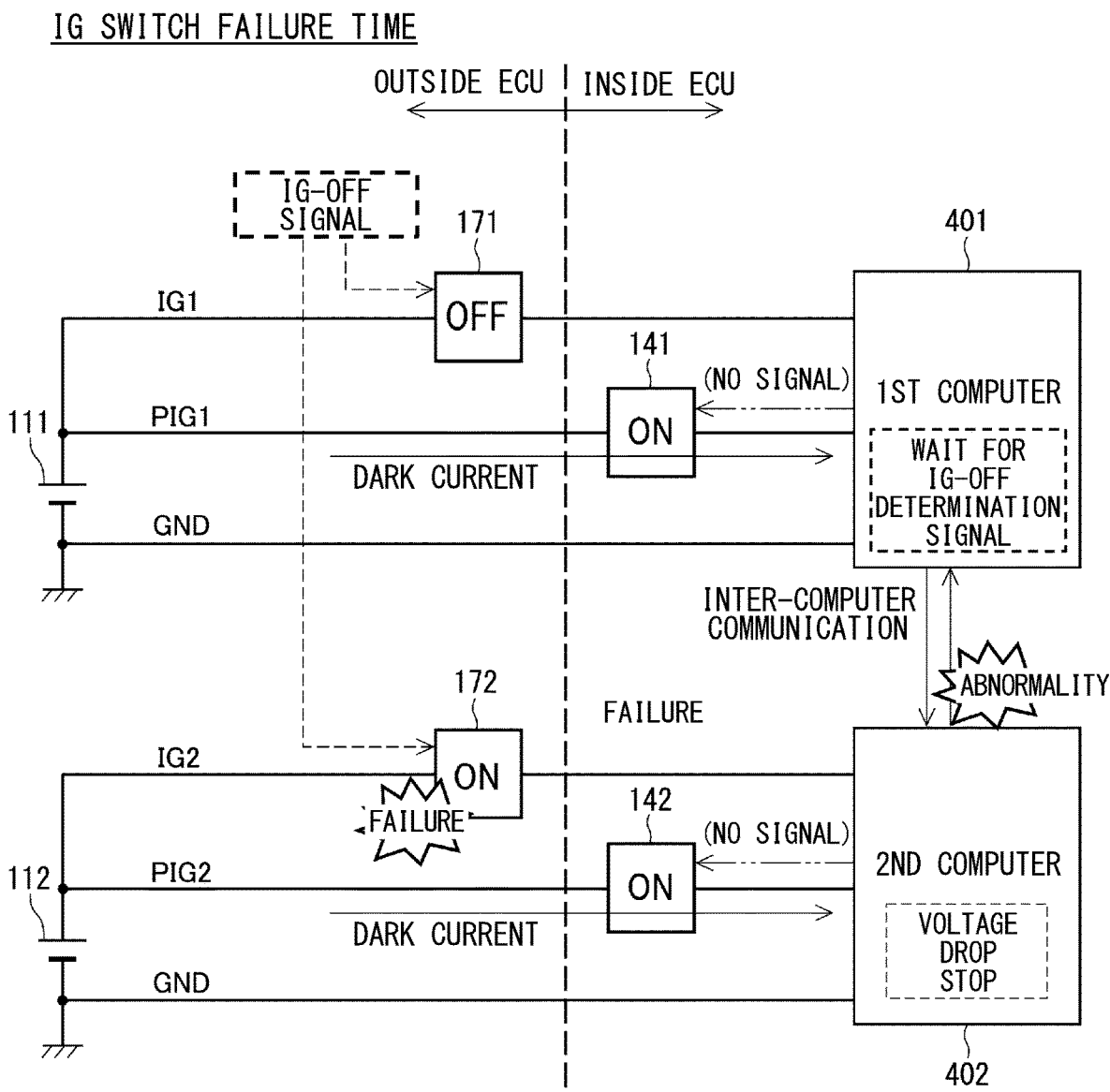
FIG. 18 is a diagram illustrating an example of the same event when the IG switch fails.

Here, with reference to FIG. 17 and FIG. 18, an example of an event in which the IG-OFF determination signal of the other microcomputer is not received within the wait period and the post-arbitration IG-OFF determination is not made will be described. FIG. 17 and FIG. 18 schematically show relations among the IG switches 171 and 172 provided outside the ECU referred to in FIG. 7, the ON/OFF operations of the power supply relays 141 and 142 provided inside the ECU referred to in FIG. 6, and the IG-OFF determinations of the microcomputers 401 and 402. Here, the power supply relays 141 and 142 are assumed to be provided for each system.

In the normal state shown in FIG. 17, the IG switches 171 and 172 of each system are normally turned off when the IG-OFF signal is input. Each microcomputer 401, 402 recognizes it, makes the IG-OFF determination, and makes the post-arbitration IG-OFF determination by communicating with each other. Then, each microcomputer 401, 402 outputs a relay OFF signal to the corresponding power supply relay 141, 142, and the power supply relay 141, 142 is turned off to interrupt the PIG line of each system.

On the other hand, when the IG switch fails as shown in FIG. 18, the IG switch 172 of the second system is not turned off even if the IG-OFF signal is input. Therefore, the second microcomputer 402 cannot make the IG-OFF determination, and the power supply relay 142 is not turned off. Therefore, a dark current continues to flow through the PIG line, and the second microcomputer 402 stops finally due to a voltage drop of the second power supply 112.

On the other hand, the IG switch 171 of the first system is normally turned off and the first microcomputer 401 makes the IG-OFF determination. However, the post-arbitration IG-OFF determination is not made while waiting for the reception of the IG-OFF determination from the second microcomputer 402. Therefore, the relay-OFF signal is not output, and the first power supply relay 141 remains in the ON state. If the IG-OFF determination from the second microcomputer 402 is waited continuously without setting the wait time, the first microcomputer 401 finally stops due to the voltage drop of the first power supply 111.

When the second microcomputer 402 or the first microcomputer 401 is stopped in this way, there is a possibility that an ECU internal failure history such as the inter-microcomputer communication abnormality remains in a storage medium. In this case, there is a possibility that the control unit may be replaced by mistake during repair because the internal failure history remains even though the control unit is normal. Therefore, by setting the wait period after the IG-OFF determination and executing the predetermined processing when the post-arbitration IG-OFF determination is not made (no end-state determination of the other system), erroneous replacement of the control unit is prevented.

Figure 19:
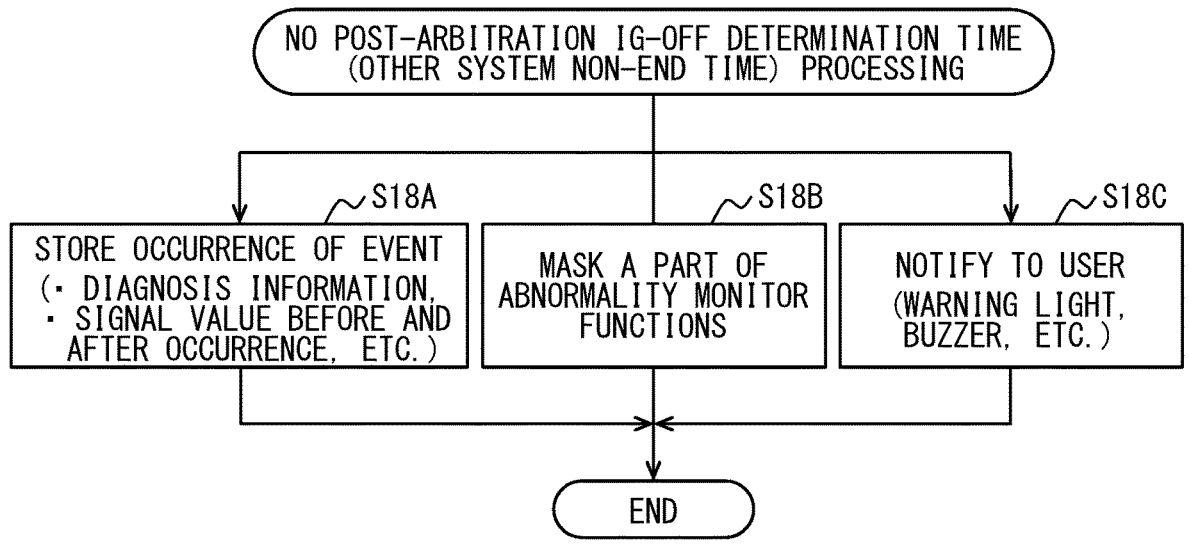
FIG. 19 is a flowchart of a processing example when a post-arbitration IG-OFF determination is not made.

FIG. 19 shows a processing example of the own microcomputer when the post-arbitration IG-OFF determination (other system end state determination) is not made. One or two of the three types of processing described in parallel may be selectively executed, or all may be executed. Two or more processing may be executed simultaneously or in any order.

In S18A, the own microcomputer stores that an event has occurred in which the post-arbitration IG-OFF determination is not made, that is, that the end state of the other system has not been made. The information to be stored includes behavior information such as diagnosis information and signal values before and after the occurrence of the event. By storing the event, the history can be analyzed when an abnormality occurs.

In S18B, the own microcomputer masks, that is, invalidates some of the abnormality monitor functions. Since the power supply is not turned off when the other system is not in the end state, the power supply voltage may decrease. If the power supply voltage drops and the microcomputer of any system stops, there is a possibility that memory data indicating the internal trouble history of the ECU such as the abnormal inter-microcomputer communication will remain, and that the control unit may be replaced erroneously. Therefore, it is possible to prevent erroneous replacement by disabling some abnormality monitor functions.

In S18C, the own microcomputer notifies the user that the other system is not in the end state by turning on a warning light, a buzzer or the like. This prevents continued use of the control apparatus in the abnormal state.

Next, drive mode switching processing in the motor drive control when the post-arbitration IG-OFF determination is not made will be described with reference to FIG. 20 to FIG. 22. In this example, the first system is assumed to be the own system and the second system is assumed to be the other system. Further, the first microcomputer of the first system is assumed to make the IG-OFF determination, and the other microcomputer of the second system does not make the IG-OFF determination. The drive mode defines the output relationship of the motor 80 in a plurality of systems, and includes a coordinated drive mode, an independent drive mode and a one system drive mode (or half assist mode).

When driving with two systems, both microcomputers share the same command values through the inter-microcomputer communication and execute coordinated driving. After the post-arbitration IG-OFF determination is not made, the own microcomputer gradually decreases the current limit value by the second end processing and proceeds to the third and final end processing. However, the other microcomputer that has not ended continues to operate. Therefore, if the coordinated driving is continued after the IG-OFF determination is not made, the current command value of the other microcomputer is also limited because of sharing of the command value. Further, when the own microcomputer decreases the current limit value to suppress the power supply voltage drop, the current command value of the other microcomputer is further limited.

Figure 20:
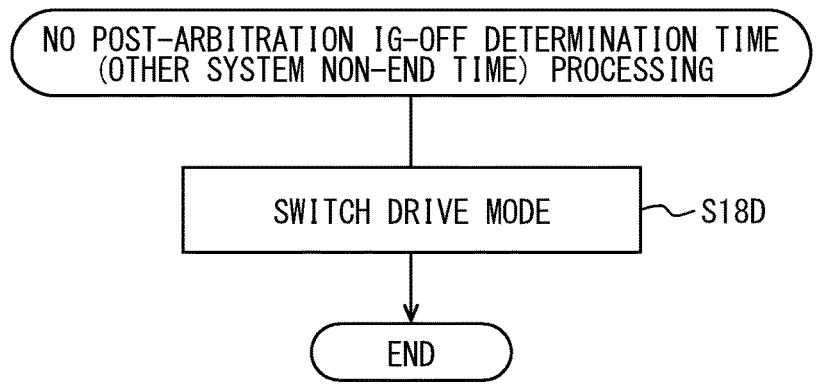
FIG. 20 is a flowchart of drive mode switching processing when the post-arbitration IG-OFF determination is not made.
Figure 21:
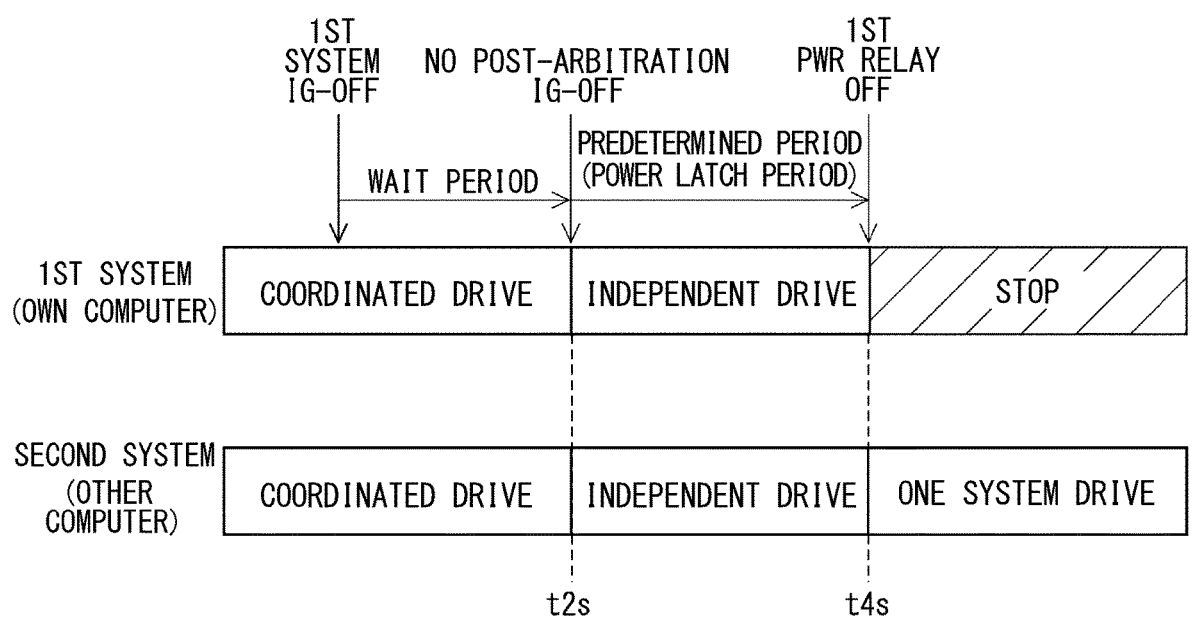
FIG. 21 is a time chart of drive mode switching processing.

Therefore, in S18D of FIG. 20, the own microcomputer and the other microcomputer switch the drive mode of each system. Specifically, as shown in FIG. 21, the post-arbitration IG-OFF determination is not made. At time t2$s$ when the other system is not determined to be in the end state, the own microcomputer and the other microcomputer make the drive mode of each system switch the respective drive mode from the coordinated drive mode to the independent drive mode. Thereby, it is possible to avoid that the electric current command value of the system which is not yet in the end state is limited.

Figure 22A:
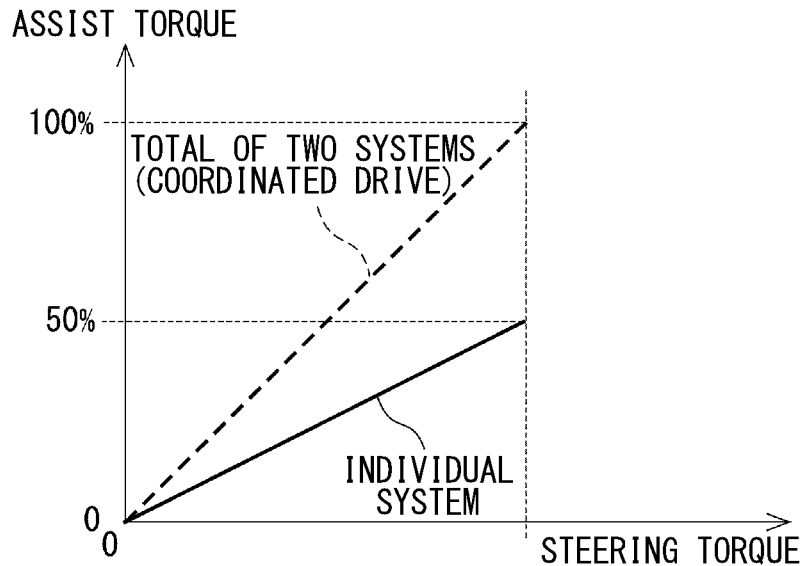
FIG. 22A and FIG. 22B are output characteristic charts in an independent drive mode and a one system drive mode, respectively.

As shown in FIG. 22A, in the independent drive mode, each system outputs one-half assist torque of the total assist torque of the two systems in the coordinated drive mode. That is, a sum of the assist torques of the two systems in the independent drive mode is equal to the assist torque in the coordinated drive mode. Similarly, in the N (three or more) systems, each system outputs 1/N assist torque at the time of coordinated driving in the independent drive mode.

Returning to FIG. 21, when the power supply relay 141 of the first system is turned off at time t4s when the predetermined period corresponding to the power latch period has elapsed after the two systems have shifted to the independent drive mode, the first system stops. At this time, the other microcomputer switches the second system from the independent drive mode to the one system drive mode. The one system drive mode is a drive mode in which the motor is driven by only one other system on the premise that one of the two systems is stopped.

Figure 22B:
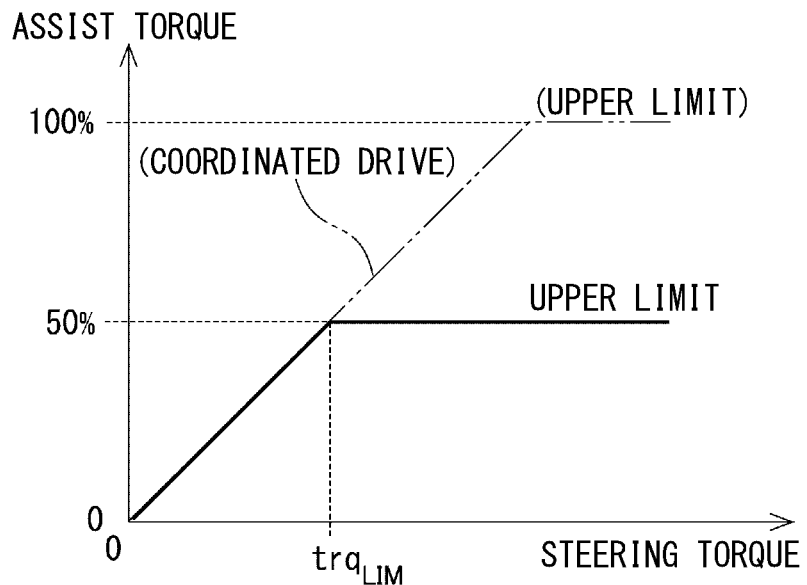

As shown in FIG. 22B, in the one system drive mode, the assist torque for the total of the two systems at the time of coordinated drive mode is output in a region where the steering torque is not more than the limit value trqLIM. Further, in a region where the steering torque exceeds the limit value trqLIM, the upper limit value of the assist torque at the time of one system drive mode is set to one half or less of the upper limit value of the assist torque at the time of the coordinated drive mode. As described above, the second system that has not been finished switches the drive mode to the one system drive, so that the assist can be continued appropriately after the first system is stopped.

Next, with reference to flowcharts of FIG. 23 and FIG. 24, processing of an application example assuming a form close to an actual mounting configuration will be described. Similarly to FIG. 13 to FIG. 22A, FIG. 22B, the description of the basic processing or the processing same as the processing shown in other drawings is omitted as appropriate in FIG. 23 and FIG. 24. The omitted part can be implemented in combination with the processing described with reference to other figures.

<Arbitration of IG-OFF Determination>

Figure 23:
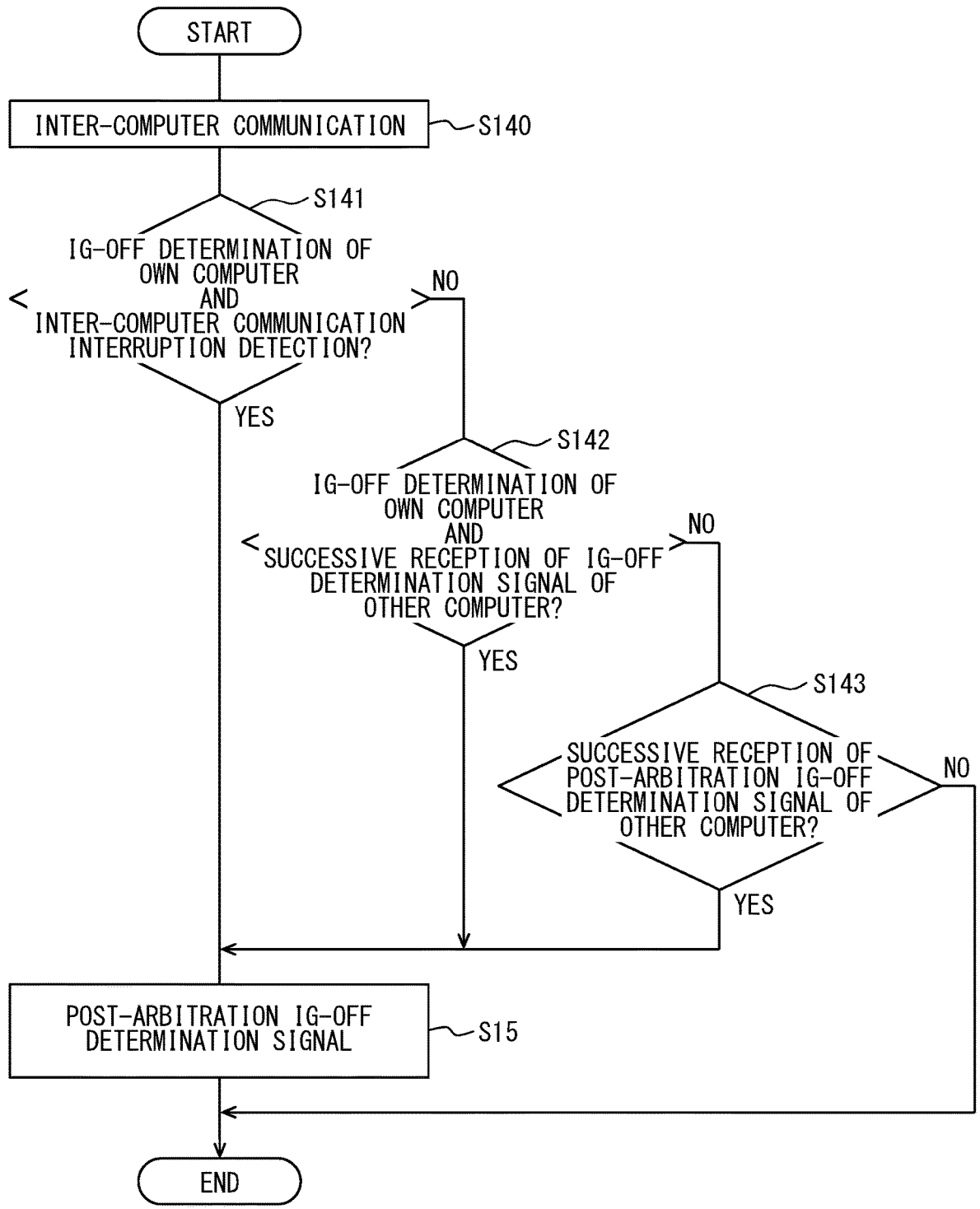
FIG. 23 is an arbitration flowchart of IG-OFF determination according to a modified embodiment.

In S140 of FIG. 23, the own microcomputer receives a signal through the inter-microcomputer communication or acquires the abnormality information of the inter-microcomputer communication. Thereafter, the conditions for making the post-arbitration IG-OFF determination by the own microcomputer are indicated as three OR conditions of S141, S142 and S143. In FIG. 23, the reception of the determination signal from the other microcomputer is clearly indicated as a successive reception.

In S141, the own microcomputer checks whether the IG-OFF determination of the own microcomputer has been made and the interruption of the inter-microcomputer communication has been detected. In S142, the own microcomputer checks whether the IG-OFF determination of the own microcomputer has been made and whether the IG-OFF determination signal of the other microcomputer has been successively received. In S143, the own microcomputer checks whether the post-arbitration IG-OFF determination signal of the other microcomputer has been successively received. If YES in any of S141, S142 and S143, the own microcomputer makes the post-arbitration IG-OFF determination in S15. If all of S141, S142 and S143 are NO, the processing ends.

<IG-OFF Determination and Determination-Time Processing>

Figure 24:
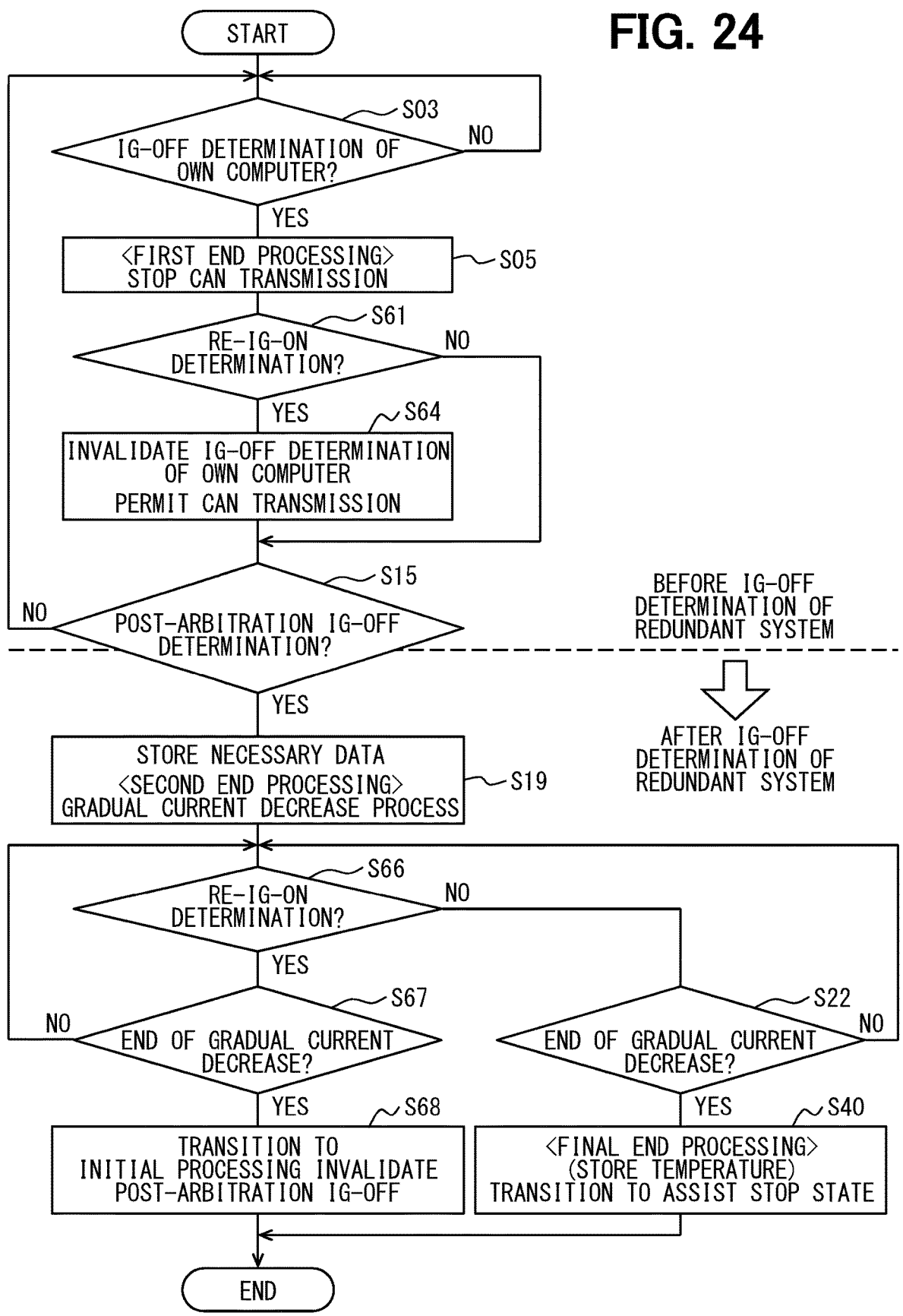
FIG. 24 is a flowchart of IG-OFF determination and determination time processing according to the modified embodiment.

If the IG-OFF determination of the own microcomputer is made in S03 of FIG. 24, the own microcomputer stops CAN transmission as the first end processing in 505. In S61, it is checked whether the re-IG-ON determination is made. If YES in S61, the IG-OFF determination of the own microcomputer is invalidated and the IG-OFF determination is not made in S64. Further, the CAN transmission is permitted. If NO in S61, S64 is skipped and not executed. In S15, it is checked whether the post-arbitration IG-OFF determination of the microcomputer is made. If NO, the processing returns to S03. The above-described processing is the processing executed before the IG-OFF determination of the redundant system is made.

If YES in S15, the processing proceeds to S19. Processing of S19 and subsequent steps is the processing executed after the IG-OFF determination of the redundant system is made. In S19, both microcomputers store necessary data and execute the gradual current decrease processing as the second end processing. In S66, it is checked whether the re-IG-ON determination has been made. If YES in S66, it is checked in S67 whether the gradual current decrease has been completed. In case of YES in S67, in S68, both microcomputers shift to initial processing executed at the activation time. Further, the post-arbitration IG-OFF determination is invalidated and the post-arbitration IG-OFF determination is not made. If NO in S67, the processing returns to S66.

On the other hand, if the re-IG-ON determination is not made and the check result at S66 is NO, it is checked in S22 whether the gradual current decrease has been completed. In case of YES in S22, both microcomputers store the temperature as the final end processing in S40 and shift to the assist stop state. If NO in S22, the processing returns to S66.

In the present embodiment, by appropriately combining the additional processing of FIG. 13 to FIG. 24, it is possible to appropriately execute gradual decrease and stop of the assist operation at the time of IG-OFF determination, gradual increase and return at the time of re-IG-ON and the like according to the driver's intention.

Other Embodiment (A) The present disclosure is not limited to the control apparatus functioning as the motor control apparatus except for control which is peculiar to the motor drive, and is applicable to any control apparatuses which turn off based on the post-arbitration OFF determination by mutual communication of the OFF determinations between the plurality of microcomputers 401 and 402 at the operation stop time. In this case, the motor drive circuits 701 and 702 of the above embodiment are generalized to electric circuits, and the motor drive signals Dr1 and Dr2 are generalized to current supply signals. The following modifications (B) to (E) are cases where the control apparatus of the present disclosure functions as the motor control apparatus.

(B) The ECU 10 of the above embodiment drives the motor 80 including two winding sets 801 and 802 by the redundant system (for example, two systems). However, the present disclosure is not limited to this, and the motor control apparatus of the present disclosure may be any apparatus that drives a motor including a plurality of winding sets by a redundant system of two or more systems. That is, the motor drive apparatus of the present disclosure may include three or more microcomputers including the two microcomputers described in the above embodiment. In that case, it is determined that the post-arbitration IG-OFF determination is made when the IG-OFF determination of one own microcomputer is made and the IG-OFF determination signals are received from all other microcomputers other than the own microcomputer. For example, in the second end processing, the current command value or current limit value of all the microcomputers is shared and gradually decreased. Further, the command value difference between the two systems is extended to a command value difference between the own system and any other system.

Further, when the communication between the first microcomputer and the second microcomputer is interrupted, for example, it is assumed that the communication between the first microcomputer and the third microcomputer is effective. In this case, it may be determined that the IG-OFF determination of the redundant system is made when the IG-OFF determination is made in the first microcomputer and the first microcomputer receives the IG-OFF determination signal from the third microcomputer.

(C) The motor control apparatus of the present disclosure is not limited to the EPS steering assist motor, but may be applied to a motor for other applications mounted on a vehicle or a motor of a system other than the vehicle. In that case, the assist start and the assist stop in the above embodiment are generally regarded as a motor drive start and a motor drive stop.

In addition, when mounted on a hybrid vehicle or an electric vehicle other than an engine vehicle, a ready switch may be used as a vehicle switch instead of the IG switch. Furthermore, in a general system other than a vehicle, any system switch that switches between an on-state that is an operation start state of the system and an off-state that is an operation stop state may be used. In an embodiment in which the vehicle switch and the system switch other than the IG switch are turned off or turned on again, the IG-OFF determination and the re-IG-ON determination are generally regarded as an OFF determination and a re-ON determination.

(D) In the above embodiment, the current supplied to the winding sets 801 and 802 is used as the control amount related to the motor drive control. However, in other motor control apparatuses, the rotation speed, rotation angle (including steering angle in EPS), torque, etc. may be used. Further, in case that the control amount is defined as a negative value, for example, the upper limit of the control amount may be regarded as the upper limit of an absolute value of the control amount.

(E) In the motor 80 to be controlled in the above embodiment, the phase difference between the two winding sets 801 and 802 is not limited to the electrical angle of 30 [deg], and may be arranged in the same phase, for example. In addition, the number of phases of the multi-phase brushless motor is not limited to three phases but may be four or more phases. Further, the motor to be driven is not limited to the AC brushless motor but may be a DC motor with brushes. In that case, an H-bridge circuit may be used as a motor drive circuit.

The present disclosure should not be limited to the embodiments described above, and various other embodiments may be implemented without departing from the scope of the present disclosure.

Control units and methods described in the present disclosure may be implemented by a special purpose computer which is configured with a memory and a processing or programmed to execute one or more particular functions embodied in computer programs of the memory. Alternatively, the control unit described in the present disclosure and the method thereof may be realized by a dedicated computer configured as a processor with one or more dedicated hardware logic circuits. Alternatively, the control unit and the method described in the present disclosure may be realized by one or more dedicated computer, which is configured as a combination of a processor and a memory, which are programmed to execute one or more functions, and a processor which is configured with one or more hardware logic circuits. The microcomputer programs may be stored, as instructions to be executed by a computer, in a tangible non-transitory computer-readable medium.

What is claimed is:

1. A control apparatus provided to function as a motor control apparatus for driving a motor having a plurality of winding sets, the control apparatus comprising:
   a plurality of motor drive circuits provided in correspondence to the plurality of winding sets;
   a plurality of microcomputers provided in correspondence to the plurality of motor drive circuits to form a plurality of systems, respectively, the plurality of microcomputers including first microcomputer and a second microcomputer and outputting motor drive signals to the motor drive circuits, respectively, each of the plurality of microcomputers calculating a control amount related to drive control of the motor and generating a motor drive signal based on the control amount; and
   at least one power supply relay capable of turning off power supplied from a power supply to each of the motor drive circuits;
   wherein each of the plurality of microcomputers is configured to execute OFF check processing and inter-microcomputer communication processing, the OFF check processing making an OFF determination when a system switch for switching an on-state indicating an activated state of the system and an off-state indicating an off-state of a stop state of the system is turned off and a predetermined condition is satisfied, and the inter-microcomputer communication processing transmitting and receiving information indicating the OFF determination between the first microcomputer and the second microcomputer;
   when the OFF determination of the first microcomputer is made in a first system including the first microcomputer, the first microcomputer executes first end processing as a first stage of end processing and transmits the OFF determination signal to the second microcomputer;
   when the OFF determination signal is received from the second microcomputer, the first microcomputer determines that a post-arbitration OFF determination is made and starts second end processing for gradually decreasing the control amount from a present value; and
   when the second end processing is completed and power-off preparation of the first microcomputer and the second microcomputer is completed, the first microcomputer executes final end processing for turning off the at least one power supply relay.

2. The control apparatus according to claim 1, wherein:
   each of the plurality of microcomputers starts third end processing for holding a computer control power supply between a completion of the second end processing and the final end processing, and transmits a power-off preparation completion signal of the first microcomputer to the second microcomputer.

3. The control apparatus according to claim 1, wherein:
   the control amount is a current supplied to the winding set; and
   each of the plurality of microcomputers generates the motor drive signal based on a current command value and a current limit value and gradually decrease the current command value or the current limit value from a present current value in the second end processing.

4. The control apparatus according to claim 1, wherein:
   when the system switch is turned off before starting of driving the motor, each of the plurality of microcomputers does not start driving the motor based on the OFF determination of the first microcomputer.

5. The control apparatus according to claim 1, wherein:
when the inter-microcomputer communication through the inter-microcomputer communication processing is interrupted, each of the plurality of microcomputers invalidates the OFF determination signal received from the second microcomputer and determines that the post-arbitration OFF determination is made based on only the OFF determination of the first microcomputer.

6. The control apparatus according to claim 1, wherein:
when the OFF determination of the first microcomputer is made and receives the OFF determination signal from the second microcomputer, the first microcomputer transmits the post-arbitration OFF determination signal indicating that the post-arbitration OFF determination is made; and
the second microcomputer receiving the post-arbitration OFF determination signal starts the second end processing.

7. The control apparatus according to claim 1, wherein:
when the OFF determination of the first microcomputer is made, each of the plurality of microcomputers invalidates, in the first end processing, a command value abnormality determination which indicates an abnormality when a difference in control amount command values between the first system and any one of second systems.

8. The control apparatus according to claim 1, wherein:
when a re-ON determination indicating that the system switch is turned on again after the post-arbitration OFF determination has been made, each of the plurality of microcomputers gradually increase a control amount command value or a control amount limit value of the first system independently.

9. The control apparatus according to claim 1, wherein:
each of the plurality of microcomputers gradually decreases control amount command values and control amount limit values of all the plurality of systems in common and stops driving of the motor in the second end processing.

10. The control apparatus according to claim 1, wherein:
each of the plurality of microcomputers gradually decreases a control amount command value or a control amount limit value of the first system independently and stops driving of the motor in the second end processing.

11. The control apparatus according to claim 1, wherein:
when the first microcomputer does not receive the OFF determination signal within a predetermined wait period after the OFF determination of the first microcomputer and does not make the post-arbitration OFF determination, the first microcomputer gradually decreases a control amount command value or a control amount limit value of only the first microcomputer independently and stops driving of the motor executed by the first system in place of the second end processing.

12. The control apparatus according to claim 1, wherein:
when the first microcomputer does not receive the OFF determination signal of the second microcomputer within a predetermined wait period after the OFF determination of the first microcomputer, the first microcomputer stores an occurrence of an event which does not make the post-arbitration OFF determination.

13. The control apparatus according to claim 1, wherein:
when the inter-microcomputer communication processing receives same signals from the second microcomputer for two or more times in succession, the received signal is made effective.

14. The control apparatus according to claim 1, wherein:
each microcomputer of the plurality of systems is mounted in a vehicle and starts the second end processing, when the first microcomputer makes the OFF determination and a vehicle speed decreases from a speed higher than a first speed threshold value to a speed lower than a second speed threshold value.

15. A control apparatus comprising:
a plurality of electric circuits;
a plurality of power supply relays capable of turning off power supplied from a power supply to each of the electric circuits;
a plurality of microcomputers provided in correspondence to the plurality of electric circuits to form a plurality of systems, respectively, and including a first microcomputer and a second microcomputer and outputting current supply signals to the electric circuits, respectively,
wherein each of the plurality of microcomputers is configured to execute OFF check processing and inter-microcomputer communication processing, the OFF check processing making an OFF determination when a system switch for switching an on-state indicating an activated state of the system and an off-state indicating an off-state of a stop state of the system is turned off and a predetermined condition is satisfied, and the inter-microcomputer communication processing transmitting and receiving information indicating the OFF determination between the first microcomputer and the second microcomputer;
when the OFF determination of the first microcomputer is made in a first system including the first microcomputer, the first microcomputer transmits the OFF determination signal to the second microcomputer;
when the OFF determination signal is received from the second microcomputer within a predetermined wait period after the OFF determination of the first microcomputer, the first microcomputer determines that a post-arbitration OFF determination is made and turns off a power supply relay of each of the systems; and
when the OFF determination signal of the second microcomputer is not received within a predetermined wait period after the OFF determination of the first microcomputer and the post-arbitration OFF determination is not made, the first microcomputer determines that a second system is not in an end state and turns off only a power supply relay of the first system.

16. The control apparatus according to claim 15, wherein:
the first microcomputer stores a determination indicating that the second system is not in the end state when the first microcomputer determines that the second system is not in the end state.

17. The control apparatus according to claim 15, wherein:
the first microcomputer invalidates a part of an abnormality monitor function, when the first microcomputer determines that the second system is not in the end state.

18. The control apparatus according to claim 15, wherein:
the first microcomputer notifies a user of information indicating that the second system is not in the end state, when the first microcomputer determines that the second system is not in the end state.

19. The control apparatus according to claim 15, wherein:
the first microcomputer turns off the power supply relay of the first system after a predetermined period, when the first microcomputer determines that the second system is not in the end state.

20. The control apparatus according to claim 15, wherein:
the plurality of electric circuits are provided for driving a plurality of winding sets of a motor, respectively;
the plurality of microcomputers output motor drive signals as the current supply signals to the plurality of electric circuits, respectively;
the plurality of power supply relays are capable of shutting off power supply to the plurality of electric circuits, respectively; and
the first microcomputer and the second microcomputer switches a drive mode of each of the systems, when the first microcomputer des not receive the OFF determination signal of the second microcomputer within the predetermined period after the OFF determination of the first microcomputer and the post-arbitration OFF determination is not made.

\* \* \* \* \*